United States Patent
Taylor et al.

(10) Patent No.: US 9,926,955 B1
(45) Date of Patent: Mar. 27, 2018

(54) LATCH

(71) Applicant: Taylor & Lego Holdings, LLC., Myakka City, FL (US)

(72) Inventors: Alan Taylor, Myakka, FL (US); Joel Chartier, Lakewood Ranch, FL (US)

(73) Assignee: Taylor & Lego Holdings, LLC, Sarasota, FL (US)

( * ) Notice: Subject to any disclaimer, the term of this patent is extended or adjusted under 35 U.S.C. 154(b) by 138 days.

(21) Appl. No.: 14/821,139

(22) Filed: Aug. 7, 2015

Related U.S. Application Data

(60) Provisional application No. 62/034,948, filed on Aug. 8, 2014.

(51) Int. Cl.
  *E05D 7/10* (2006.01)
  *E05C 1/14* (2006.01)
  *F16B 2/00* (2006.01)

(52) U.S. Cl.
  CPC ............. *F16B 2/00* (2013.01); *Y10T 16/5398* (2015.01)

(58) Field of Classification Search
  None
  See application file for complete search history.

(56) References Cited

U.S. PATENT DOCUMENTS

| | | | |
|---|---|---|---|
| 726,577 A * | 4/1903 | Sohiek | E05D 7/1011 16/229 |
| 1,562,096 A * | 11/1925 | Kaimer | E05B 85/22 292/169.15 |
| 2,926,382 A * | 3/1960 | Knese | E05D 7/10 16/261 |
| 3,105,266 A * | 10/1963 | Flaith | E05B 65/001 16/232 |
| 3,393,539 A * | 7/1968 | Gehrie | E05B 65/5238 292/100 |
| 3,928,890 A * | 12/1975 | Baker, Sr. | E05D 7/1066 16/227 |
| 4,438,964 A * | 3/1984 | Peters | E05C 3/24 292/173 |
| 4,676,432 A * | 6/1987 | Wake | G07D 11/0009 232/16 |
| 5,413,391 A * | 5/1995 | Clavin | E05C 1/145 292/170 |
| 5,870,804 A * | 2/1999 | Wylin | B25B 5/101 24/279 |

(Continued)

*Primary Examiner* — Joshua J Michener
*Assistant Examiner* — Kyle J. Walraed-Sullivan
(74) *Attorney, Agent, or Firm* — Frijouf, Rust & Pyle, P.A.

(57) ABSTRACT

A latch for coupling a first object to a second object is disclosed comprises a primary block coupled to the first object. A locking cam is rotatably coupled to the primary block. A cam track having a sloped surface is in the locking cam. A locking stem slideably engages the primary block and traverses the locking cam. A cam pin is coupled to the locking stem. The cam pin slidably engages the sloped surface for displacing the locking stem between an extended position and a retracted position. A stem head is coupled to the cam pin. A secondary block is coupled to the second object. A cam channel is in the secondary block for receiving the locking stem. A head receiver is in the secondary block for engaging the stem head. The extended position defines an unlocked position and the retracted position defines a locked position.

20 Claims, 25 Drawing Sheets

(56) References Cited

U.S. PATENT DOCUMENTS

| | | | | |
|---|---|---|---|---|
| 7,695,028 B2* | 4/2010 | Katou | B60R 7/06 | 292/156 |
| 7,761,958 B2* | 7/2010 | Alfredsson | E05D 7/1061 | 16/231 |
| 7,810,862 B2* | 10/2010 | Smith | B60R 7/04 | 220/817 |
| 8,115,098 B2* | 2/2012 | Jones | E05D 7/1011 | 16/230 |
| 8,654,035 B2* | 2/2014 | Proffitt | H01Q 15/162 | 343/912 |
| 9,140,045 B1* | 9/2015 | Finkelstein | E05D 7/04 | |
| 2002/0070561 A1* | 6/2002 | Welsh | E05B 17/0025 | 292/143 |
| 2002/0136598 A1* | 9/2002 | Feng | A63B 25/08 | 403/322.4 |
| 2002/0149208 A1* | 10/2002 | Zamberg | E05C 19/10 | 292/98 |
| 2002/0172549 A1* | 11/2002 | Koros | B25G 3/22 | 403/305 |
| 2004/0119294 A1* | 6/2004 | Long | E05C 1/145 | 292/83 |
| 2004/0145190 A1* | 7/2004 | Kondratuk | E05C 1/14 | 292/140 |
| 2005/0017516 A1* | 1/2005 | Finardi | E05B 65/0021 | 292/137 |
| 2008/0104799 A1* | 5/2008 | Hoppe | E05D 7/0027 | 16/238 |
| 2008/0174126 A1* | 7/2008 | Kong | E05B 65/006 | 292/163 |
| 2008/0246286 A1* | 10/2008 | Ostrowski | E05B 47/0011 | 292/144 |
| 2009/0151408 A1* | 6/2009 | Petry | E05B 9/002 | 70/113 |
| 2013/0067687 A1* | 3/2013 | Mitchell | E05F 1/066 | 16/312 |
| 2013/0067689 A1* | 3/2013 | Mitchell | E05D 5/04 | 16/382 |
| 2014/0084127 A1* | 3/2014 | Lee | H01Q 1/273 | 248/544 |
| 2014/0291372 A1* | 10/2014 | Smith | B60R 7/04 | 224/539 |
| 2015/0292245 A1* | 10/2015 | Miller | E05B 347/0603 | 70/134 |
| 2016/0025121 A1* | 1/2016 | Ahnert | B25B 5/08 | 16/421 |
| 2016/0201704 A1* | 7/2016 | Pacini | F16B 5/0607 | 403/321 |
| 2016/0223012 A1* | 8/2016 | Lee | F16C 11/10 | |
| 2016/0312503 A1* | 10/2016 | Shah | E05C 1/14 | |

* cited by examiner

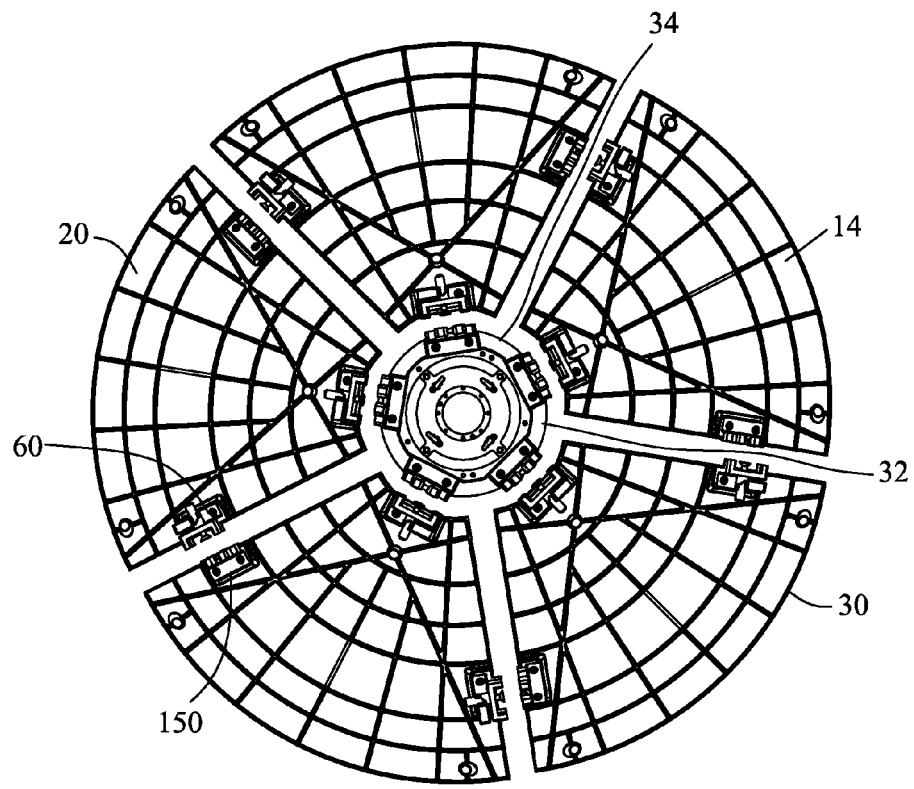
FIG. 13
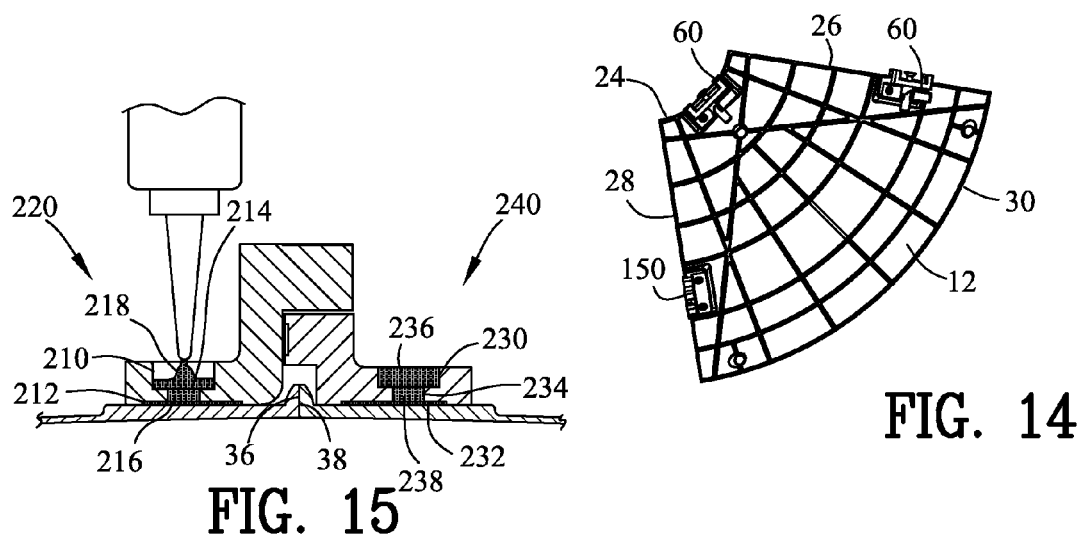
FIG. 15
FIG. 14

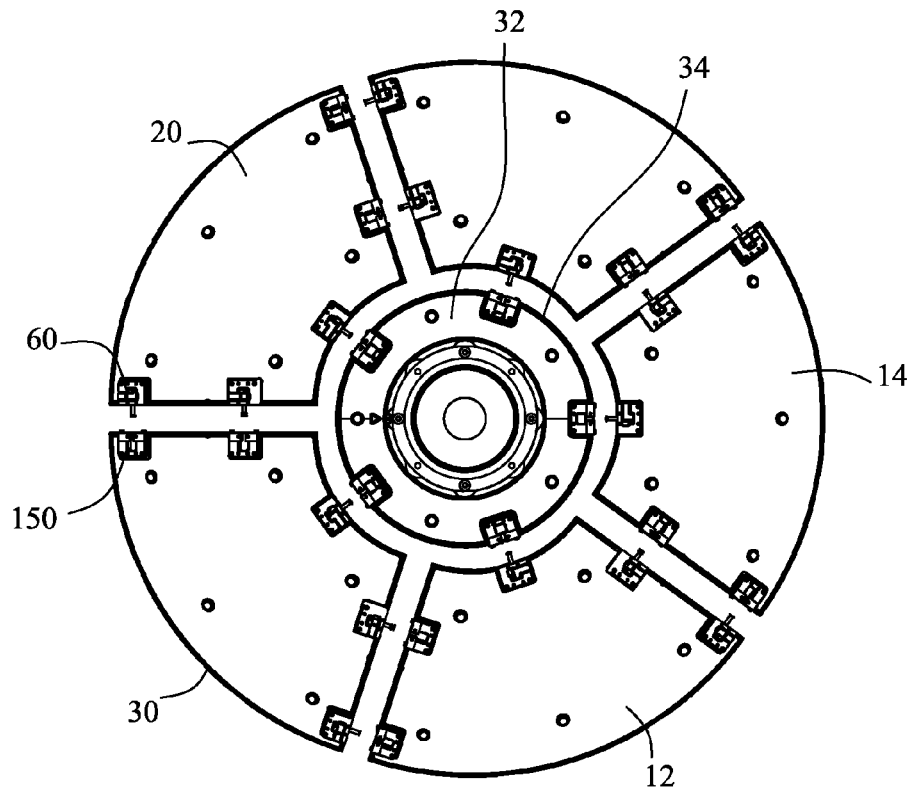
FIG. 29
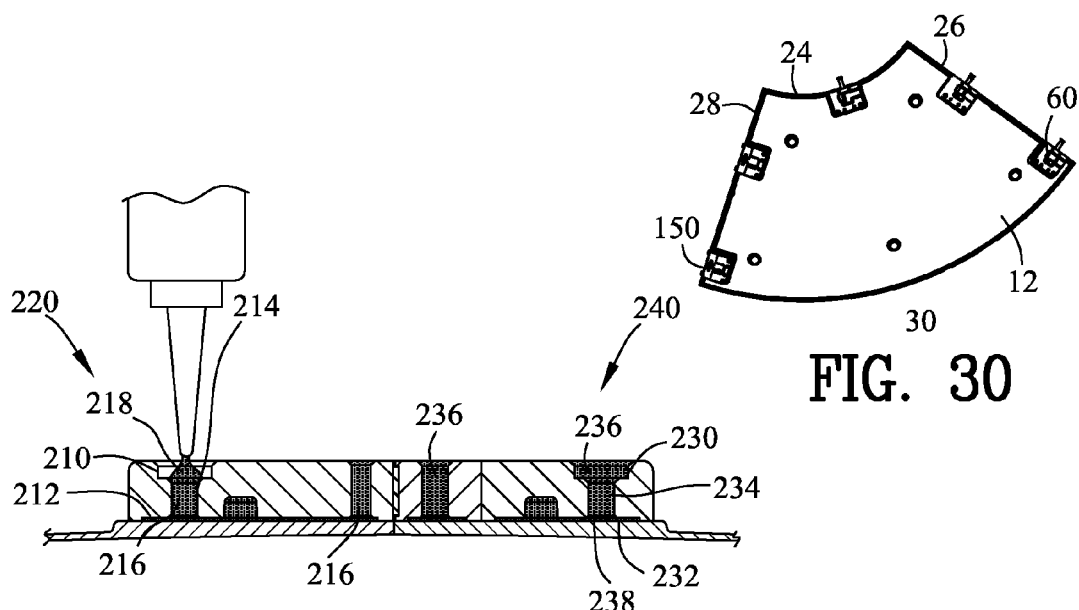
FIG. 30
FIG. 31

LATCH

CROSS-REFERENCE TO RELATED APPLICATIONS

This application claims benefit of U.S. Patent Provisional application No. 62/034,948 filed Aug. 8, 2014. All subject matter set forth in provisional application No. 62/034,948 is hereby incorporated by reference into the present application as if fully set forth herein.

BACKGROUND OF THE INVENTION

Field of the Invention

This invention relates to closures and more particularly to an improved latch.

Background of the Invention

Since the first parabolic antenna was built by Heinrich Hertz in 1888, its application has reached a broad base of use in radio technology from radio and TV communications to radio astronomy, radar and satellite communications and the like.

A parabolic dish antenna comprises a reflector, generally constructed from sheet metal, metal screen, wire grill or carbon fiber. A feed antenna is positioned at the focal point of the reflector. Construction of these components is critical since to achieve maximum gain, the waves from various parts of the antenna must arrive at the focal point in phase. Therefore, the shape of the dish must be accurate to within a small fraction of a wavelength. This requirement demands that the reflector must be stiff enough to withstand the negative effects of shipping, handling, assembly and be resistant to the constant wind loads.

There have been many attempts to minimize the problem of transporting a metal dish reflector. In one system, the reflector comprises a plurality of petal like panels, that when affixed adjacent to each other, they result in a parabolic reflector. Affixing the reflector petals to each other has presented a significant problem as is well known to those skilled in the art. The assembled reflector must be an accurate parabolic structure, resistant to any movement, yet be simple to accomplish in the field. The reflector should likewise be relatively simple to disassemble for transport to another location.

The mechanism utilized to accomplish the task of adjacent petal attachment must be able to rigidly engage the two pieces, yet be capable of easily disengaging them as needed. The same device would have application in other systems having similar requirements. As examples, the requirements for closure of containers such as luggage and various types of materials containers, as well as devices and equipment requiring sturdy closure devices requiring intimate contact between adjacent parts combined with ease of closure and release would easily be addressed by such a closure device.

There have been many in the prior art who have attempted to solve these problems with varying degrees of success. None, however entirely satisfies the requirements for a complete solution to the aforestated problem.

Therefore, it is an object of the present invention to provide an improved latch that furthers the needs of the art.

Another object of this invention is to provide an improved latch to affix adjacent reflector petals of a dish antenna reflector to each other.

Another object of this invention is to provide an improved latch that is easy to install on a reflector petal.

Another object of this invention is to provide an improved latch that is easy to manufacture.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved latch for coupling a first object to a second object. The latch comprises a primary block defining a bottom surface and an upper surface and coupled to the first object. A locking cam is rotatably coupled to the primary block. A cam track is in the locking cam. The cam track has a sloped surface. A locking stem slideably engages the primary block and traverses the locking cam. A cam pin is coupled to the locking stem. The cam pin slidably engages the sloped surface of the cam track for displacing the locking stem between an extended position and a retracted position during rotation of the locking cam. A stem head is coupled to the locking stem. A secondary block defines a bottom surface and an upper surface and coupled to the second object. A cam channel is in the secondary block for receiving the locking stem. A head receiver is in the secondary block for engaging the stem head. The extended position of the locking stem distances the stem head from the head receiver for defining an unlocked position. The retracted position of the locking stem compresses the stem head with the head receiver for defining a locked position.

In another embodiment of the invention, a track indent is in the cam track for receiving the cam pin during the locked position. A track step is between the track indent and the cam track for preventing accidental removal of the cam pin from the track indent.

In another embodiment of the invention, the locking cam includes a locking cam base and a handle. A primary block aperture is within the primary block. The locking cam base is rotatably coupled within the primary block aperture for positioning the handle in a generally vertical orientation in the unlocked position and a generally horizontal orientation in the locked position.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 13 is an exploded view of FIG. 12;
FIG. 14 is a view of a single reflector section of FIG. 13 with a plurality of latches of FIG. 1;
FIG. 15 is a sectional view along line 15-15 in FIG. 12;
FIG. 29 is an exploded view of FIG. 28;
FIG. 30 is a view of a single reflector section of FIG. 29 with a plurality of latches of FIG. 16;
FIG. 31 is a sectional view along line 31-31 in FIG. 28.

Similar reference characters refer to similar parts throughout the several Figures of the drawings.

DETAILED DISCUSSION

Figure 1:
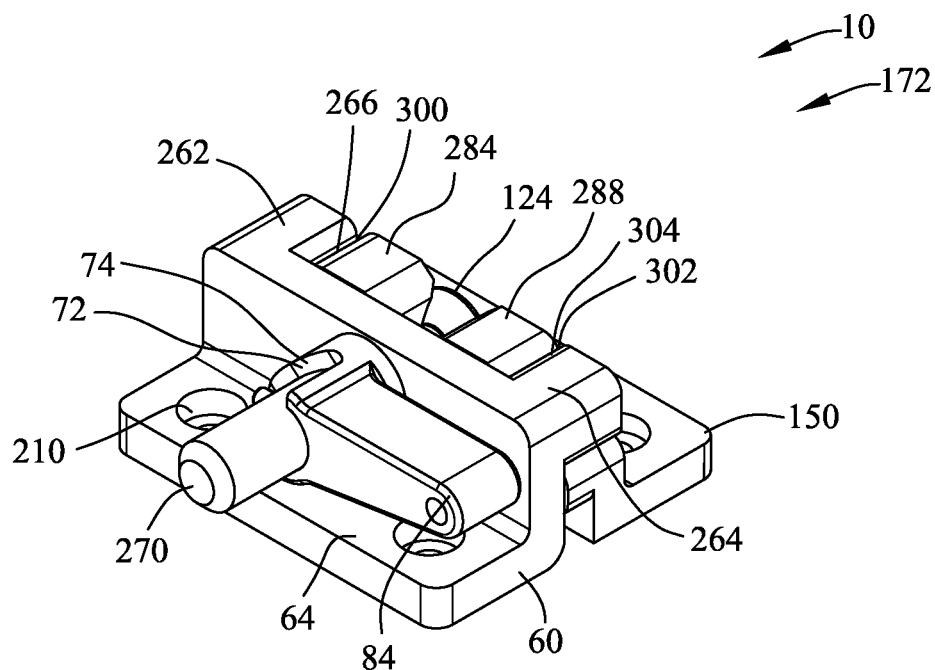
FIG. 1 is a right isometric view of a first embodiment of a latch.
Figure 2:
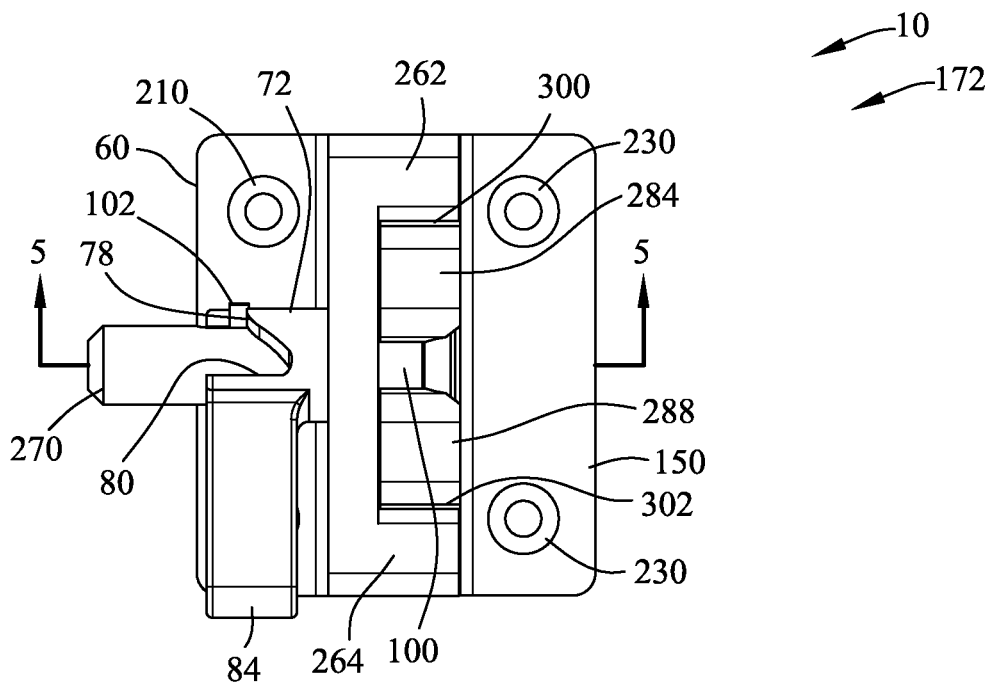
FIG. 2 is a top view of FIG. 1.
Figure 3:
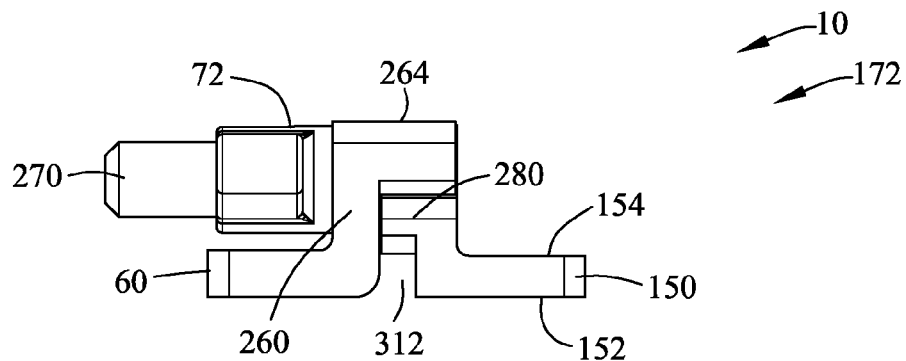
FIG. 3 is a front view of FIG. 2.
Figure 4:
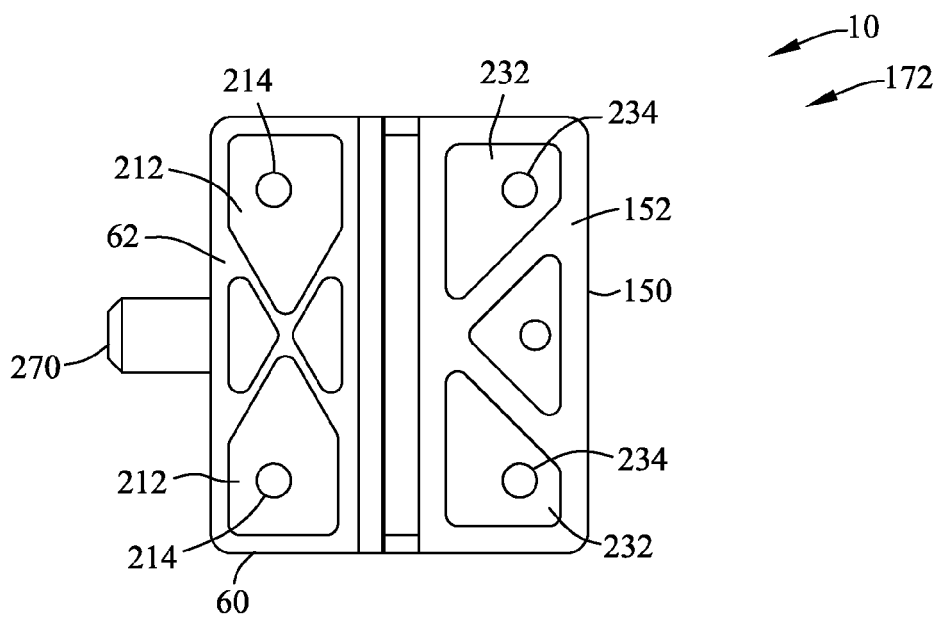
FIG. 4 is a bottom view of FIG. 2.
Figure 5:
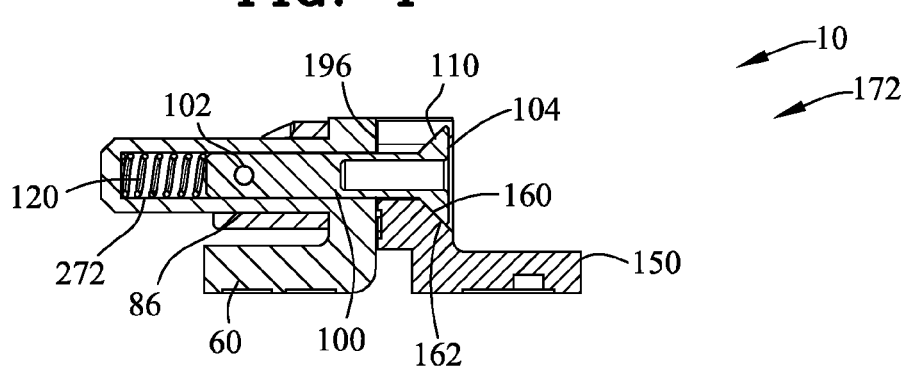
FIG. 5 is a sectional view along line 5-5 in FIG. 2.
Figure 6:
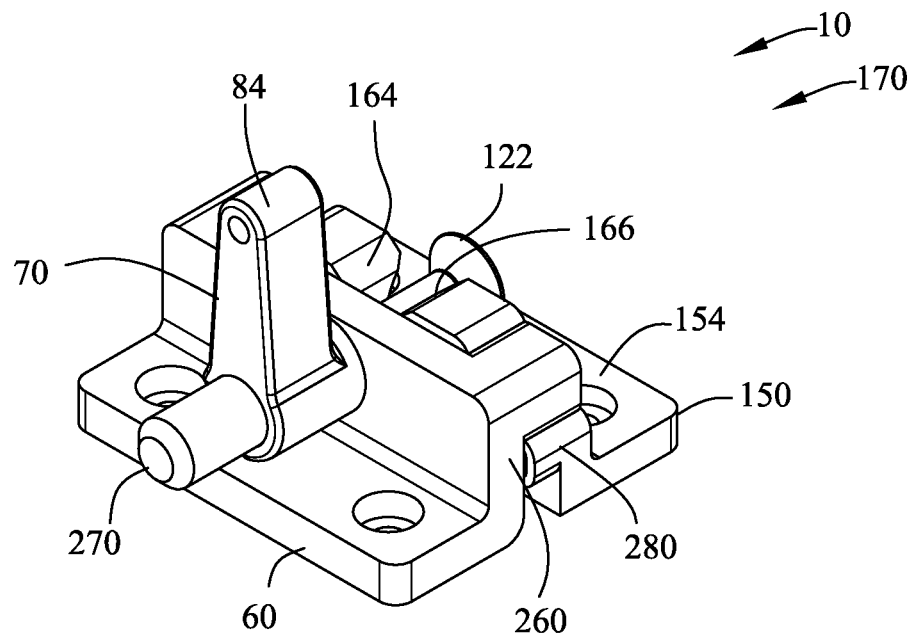
FIG. 6 is a similar view of FIG. 1 illustrating a handle in a vertical position.
Figure 7:
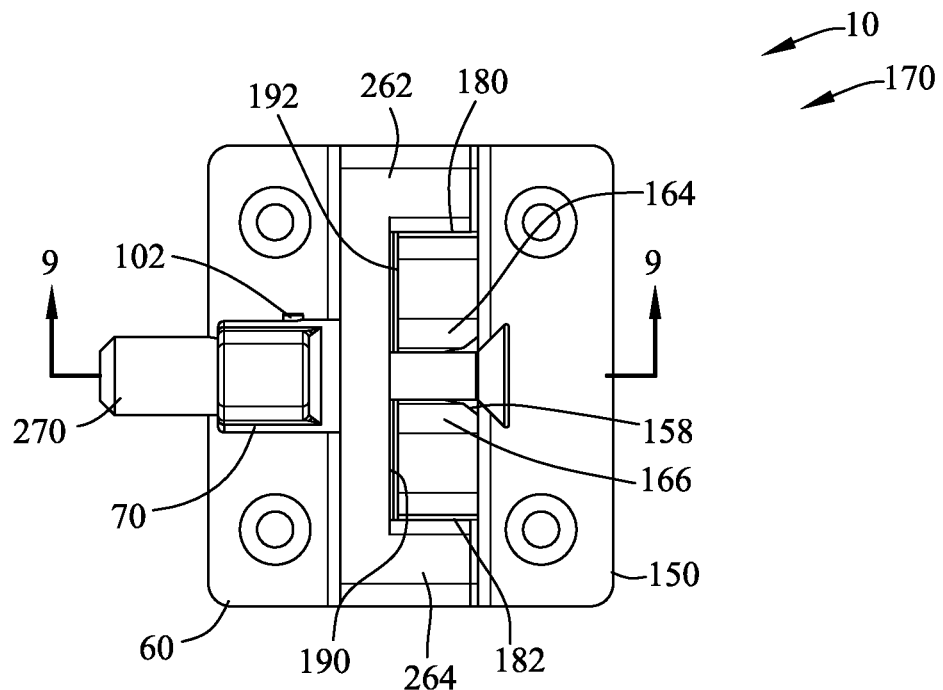
FIG. 7 is a top view of FIG. 6.
Figure 8:
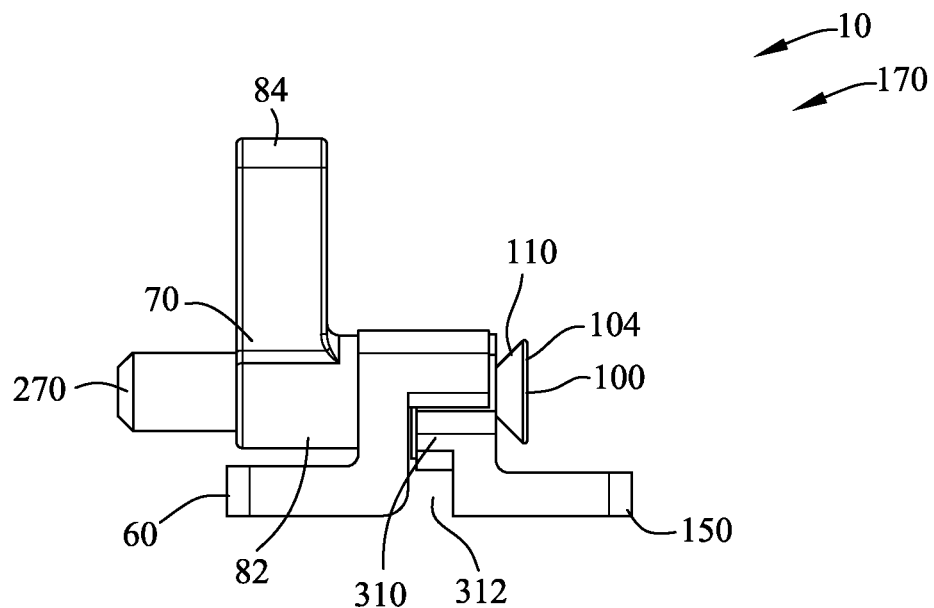
FIG. 8 is a front view of FIG. 7.
Figure 9:
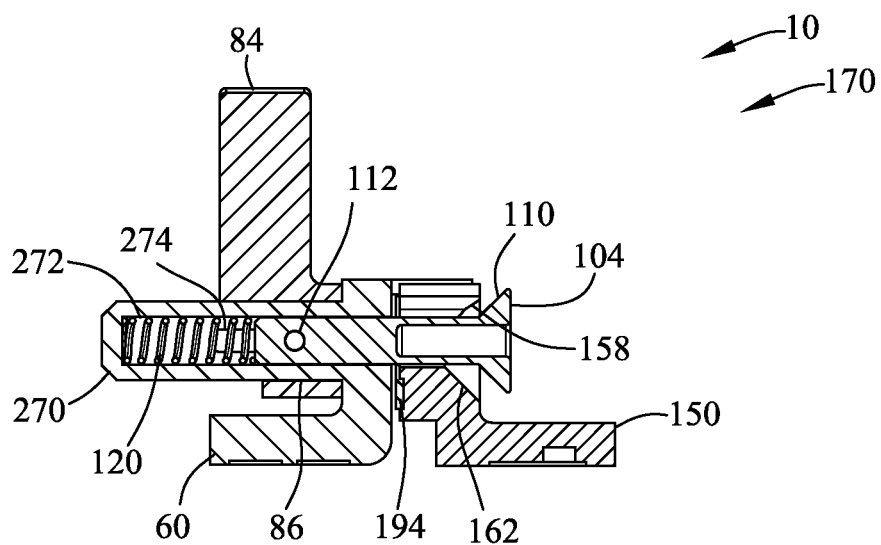
FIG. 9 is a sectional view along line 9-9 in FIG. 7.
Figure 10:
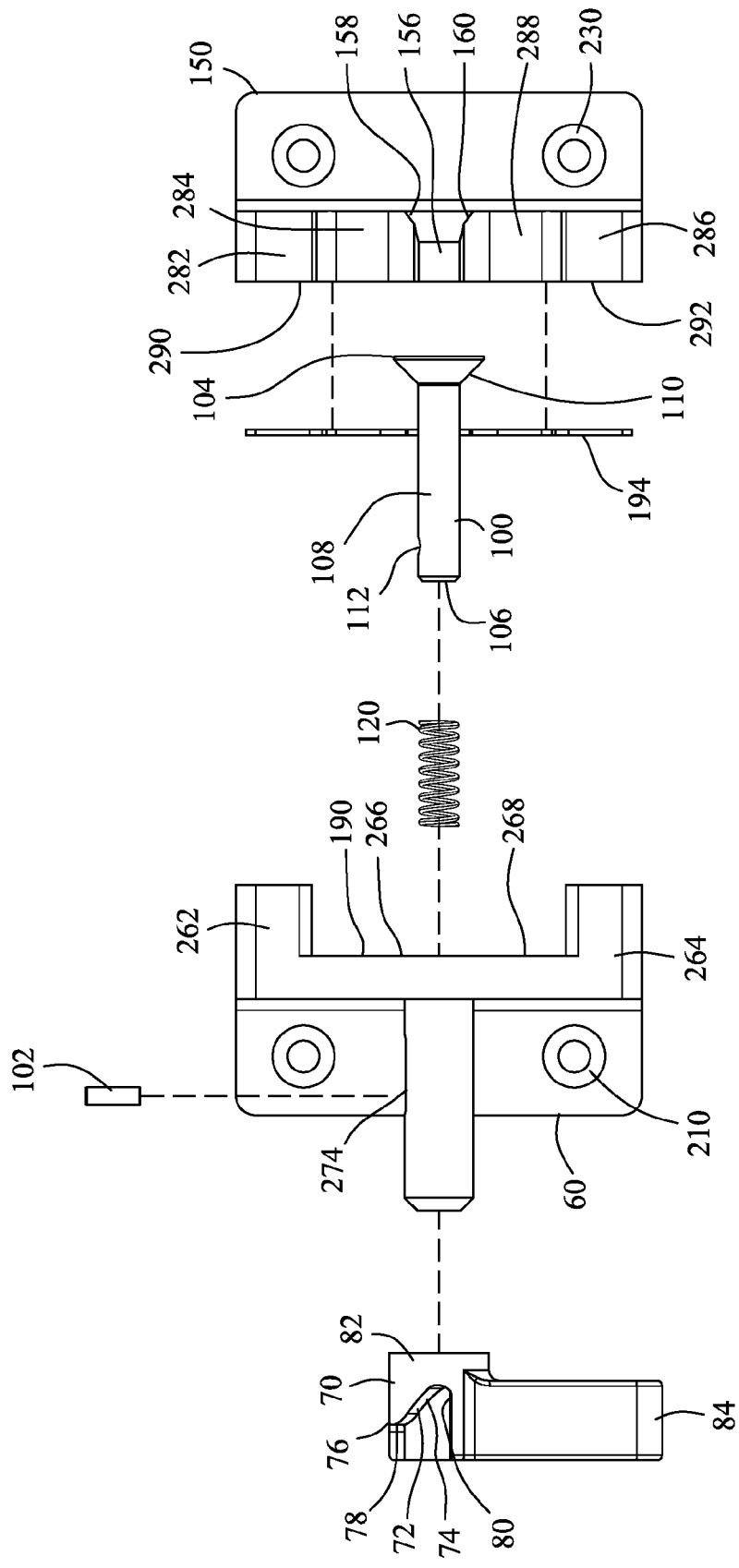
FIG. 10 is an exploded view of FIG. 2.
Figure 11:
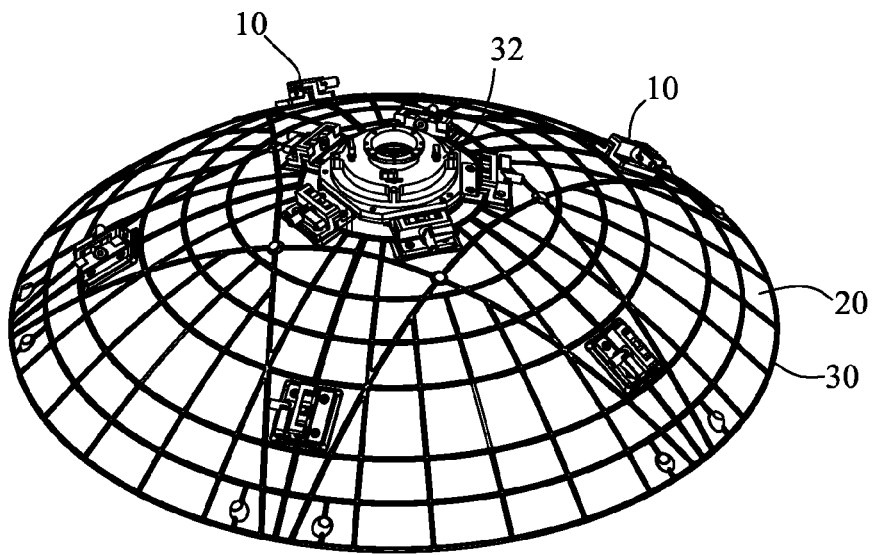
FIG. 11 is an upper isometric view of a plurality of latches of FIG. 1 coupling a reflector.
Figure 12:
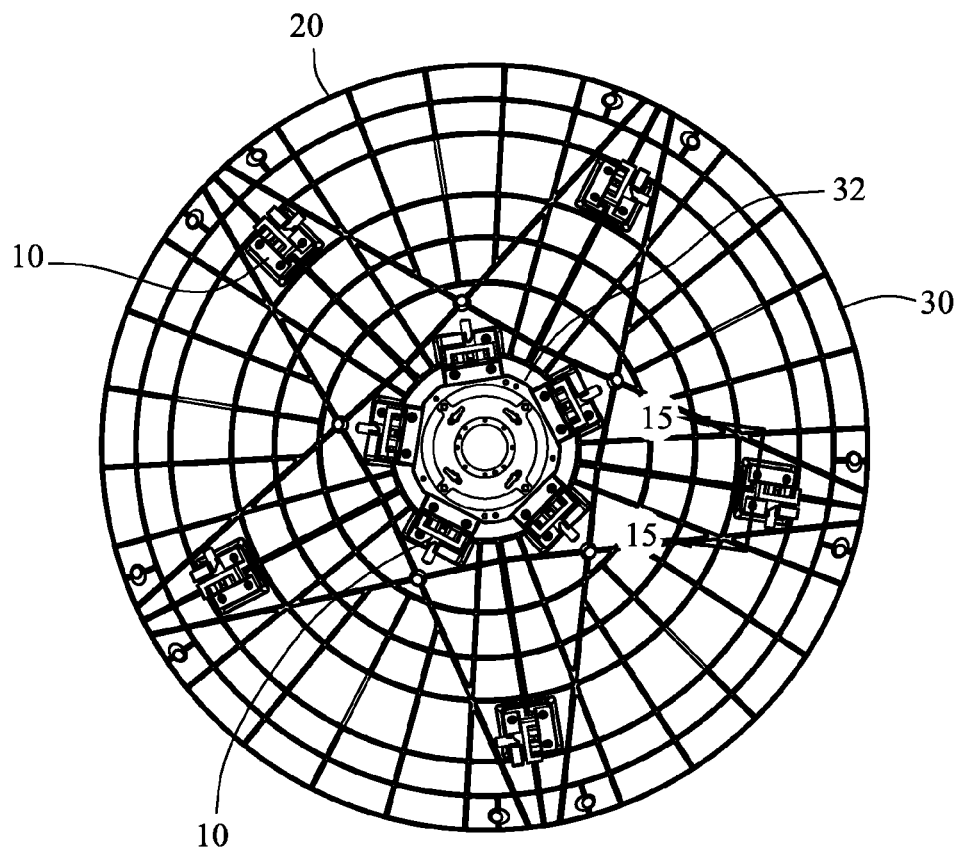
FIG. 12 is a top view of FIG. 1.
Figure 16:
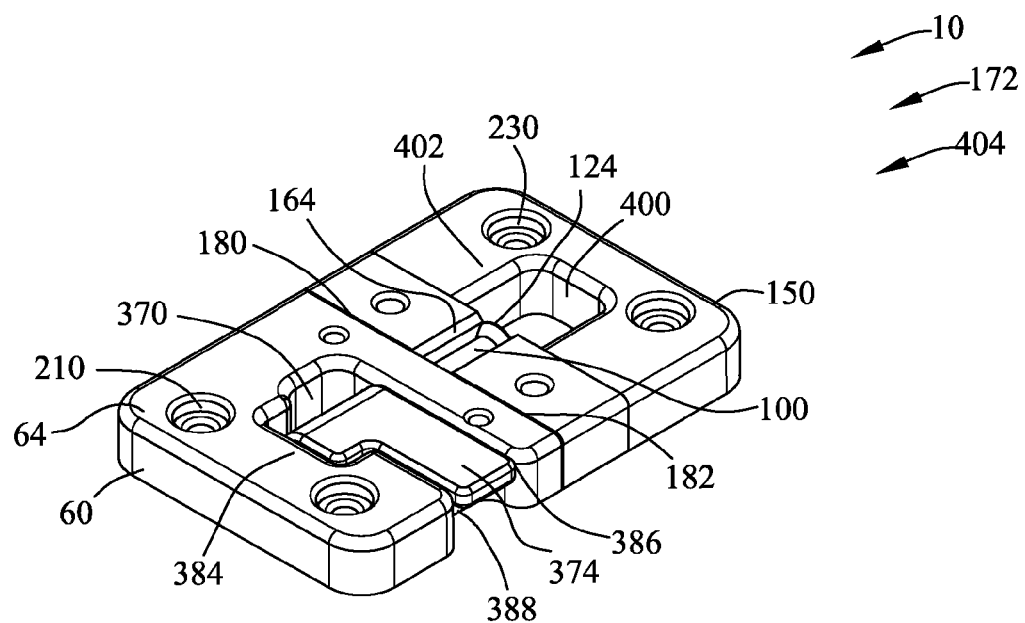
FIG. 16 is a right isometric view of a second embodiment of a latch.
Figure 17:
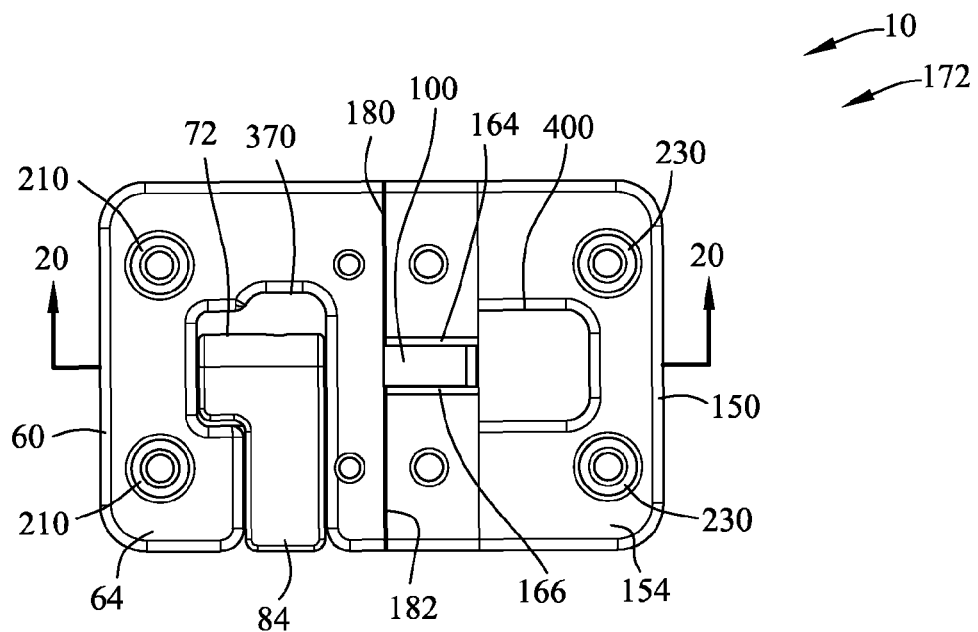
FIG. 17 is a top view of FIG. 16.
Figure 18:
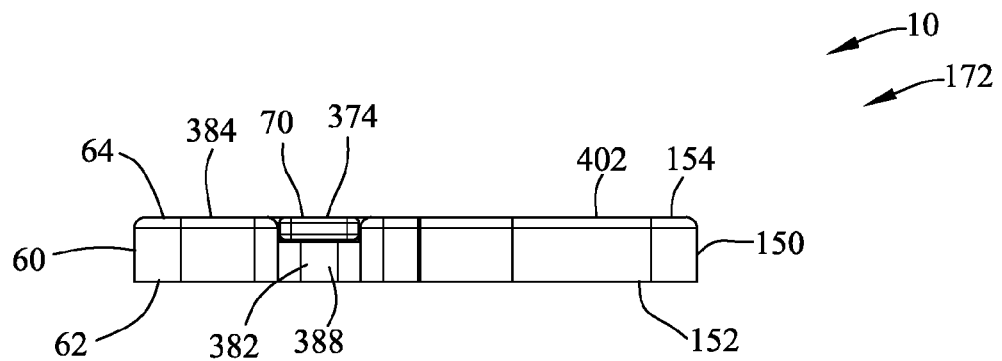
FIG. 18 is a front view of FIG. 17.
Figure 19:
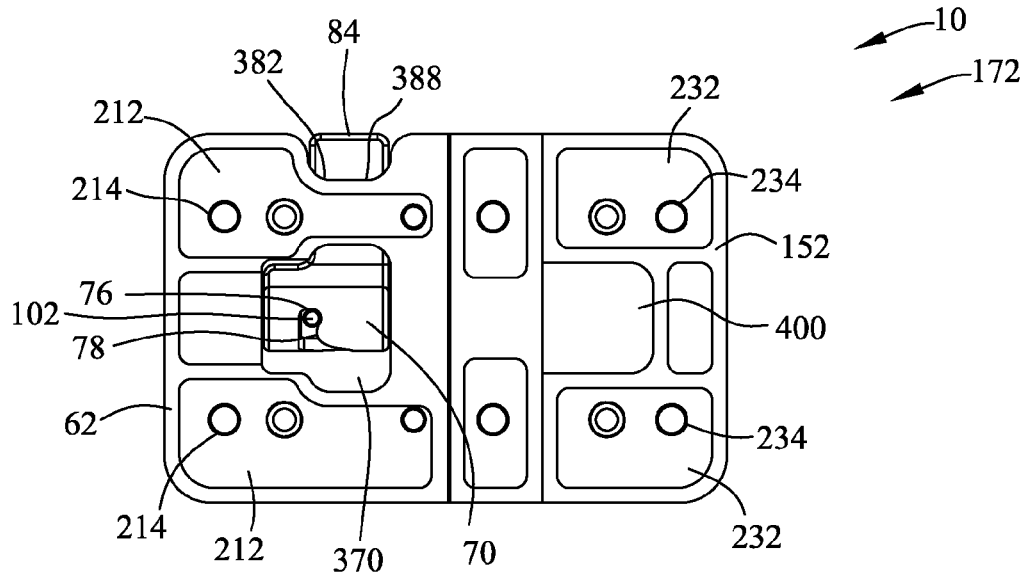
FIG. 19 is a bottom view of FIG. 17.
Figure 20:
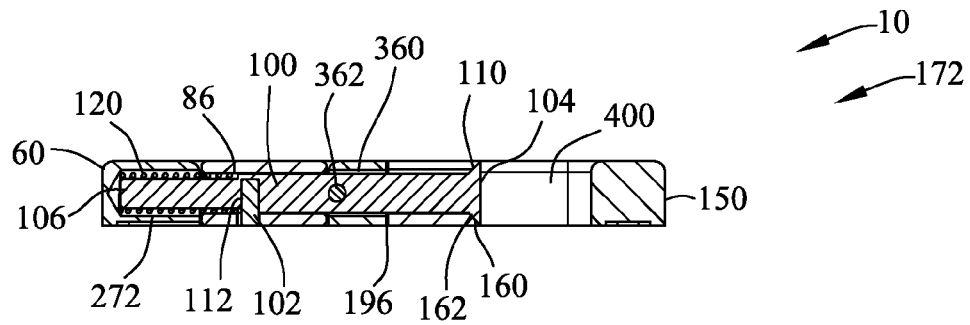
FIG. 20 is a sectional view along line 20-20 in FIG. 17.
Figure 21:
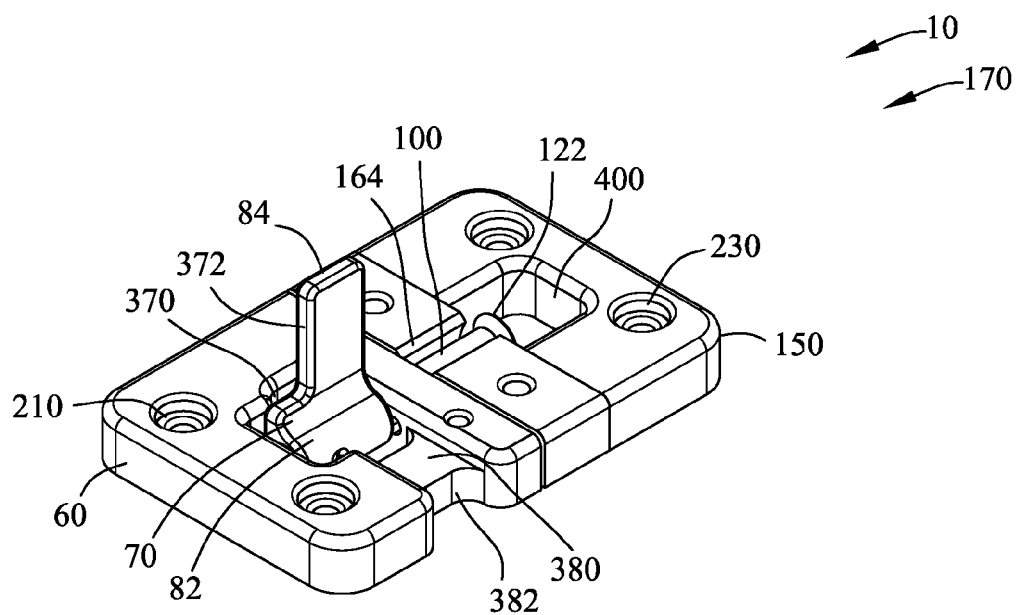
FIG. 21 is a similar view of FIG. 16 illustrating a handle in a vertical position.
Figure 22:
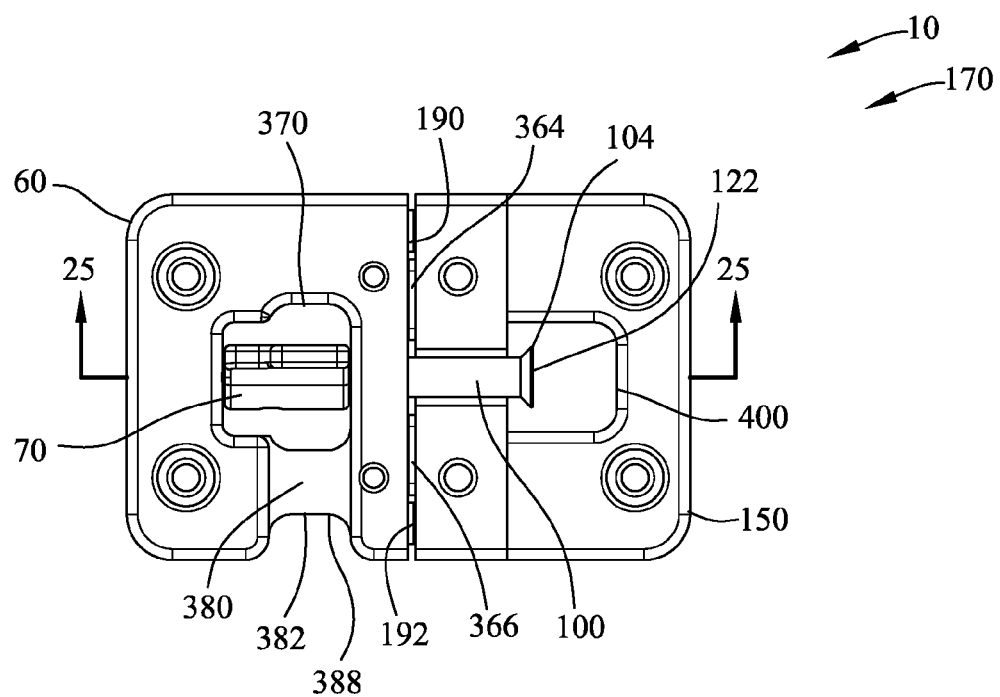
FIG. 22 is a top view of FIG. 21.
Figure 23:
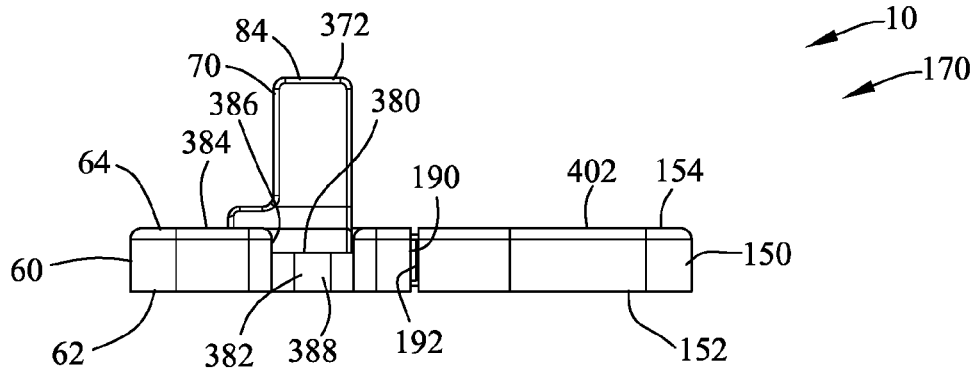
FIG. 23 is a front view of FIG. 22.
Figure 24:
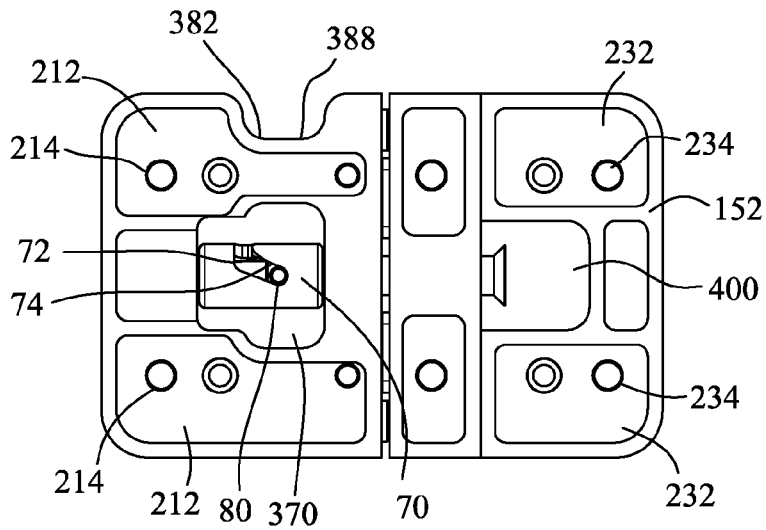
FIG. 24 is a bottom view of FIG. 22.
Figure 25:
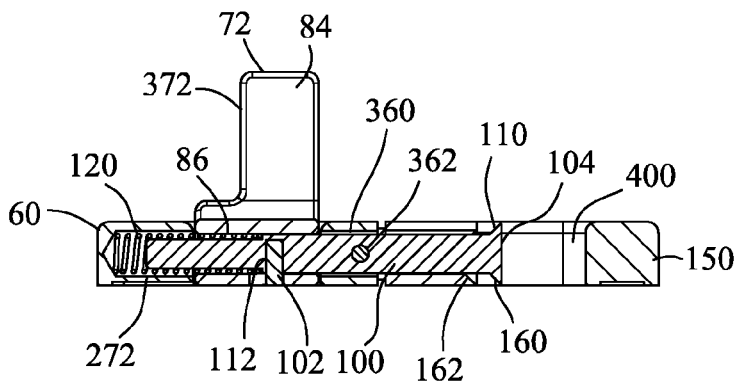
FIG. 25 is a sectional view along line 25-25 in FIG. 22.
Figure 26:
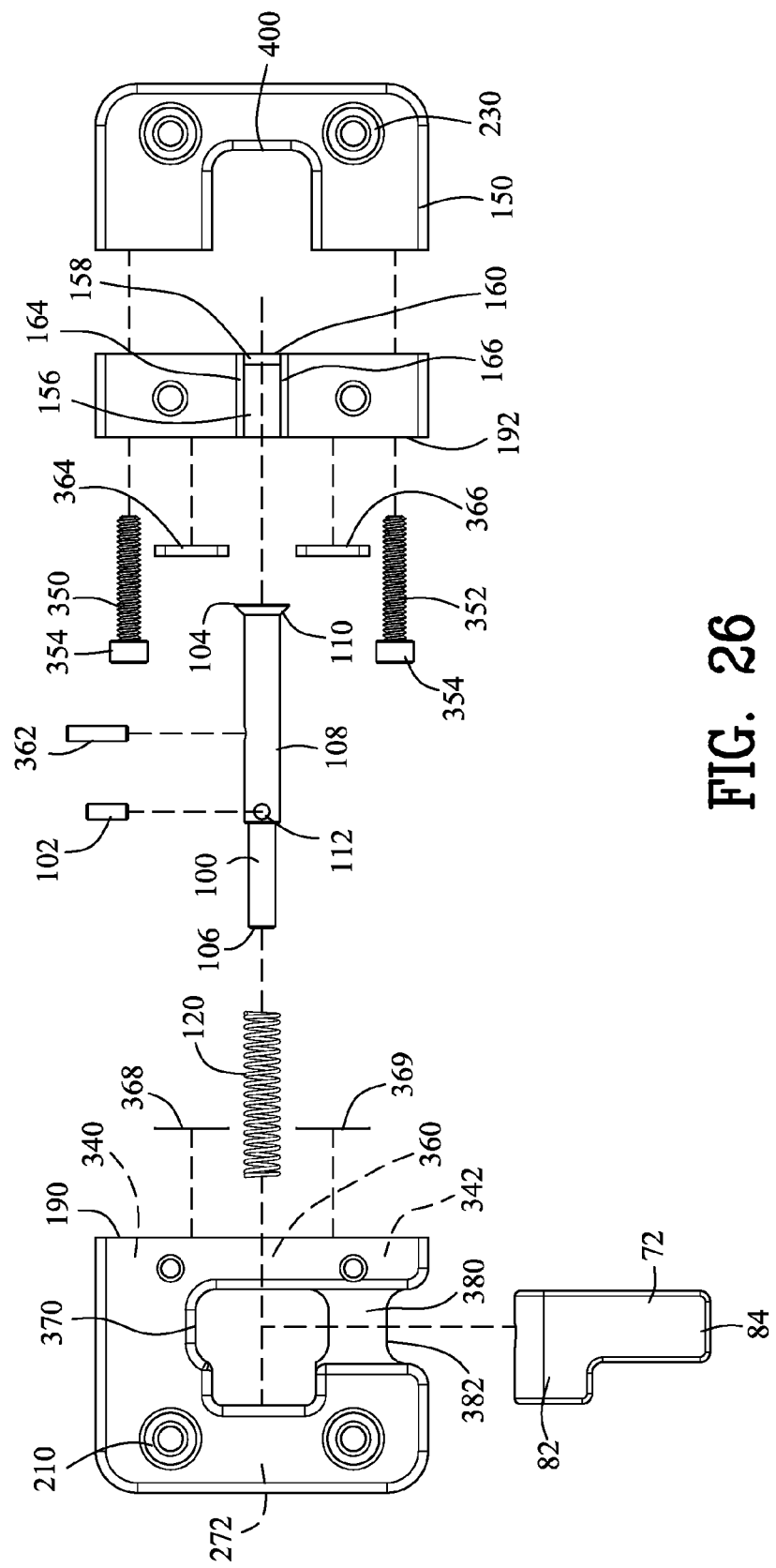
FIG. 26 is an exploded view of FIG. 17.
Figure 27:
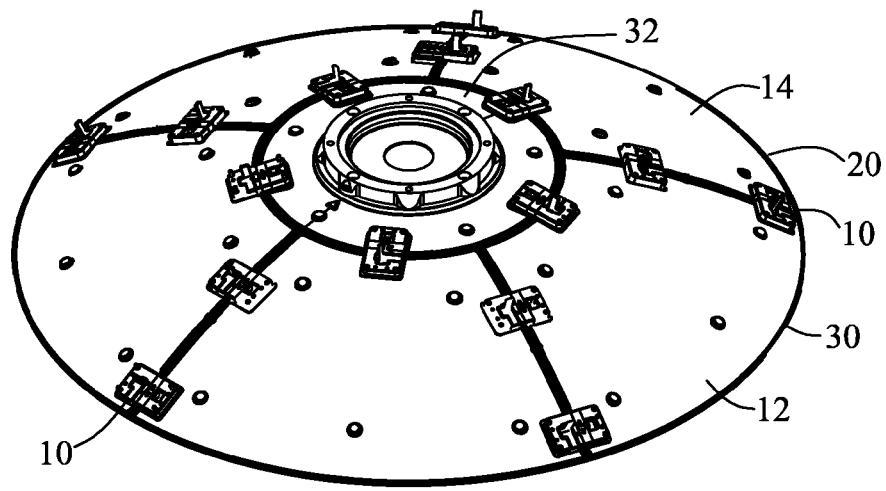
FIG. 27 is an upper isometric view of a plurality of latches of FIG. 16 coupling a reflector.
Figure 28:
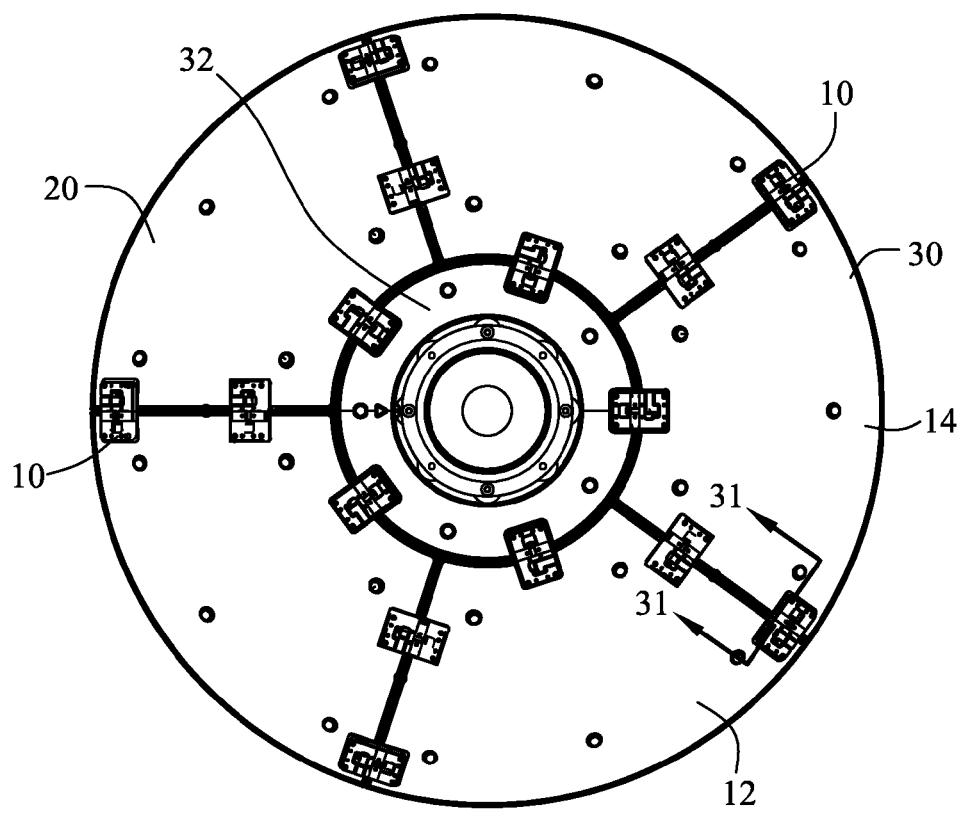
FIG. 28 is a top view of FIG. 27.
Figure 32:
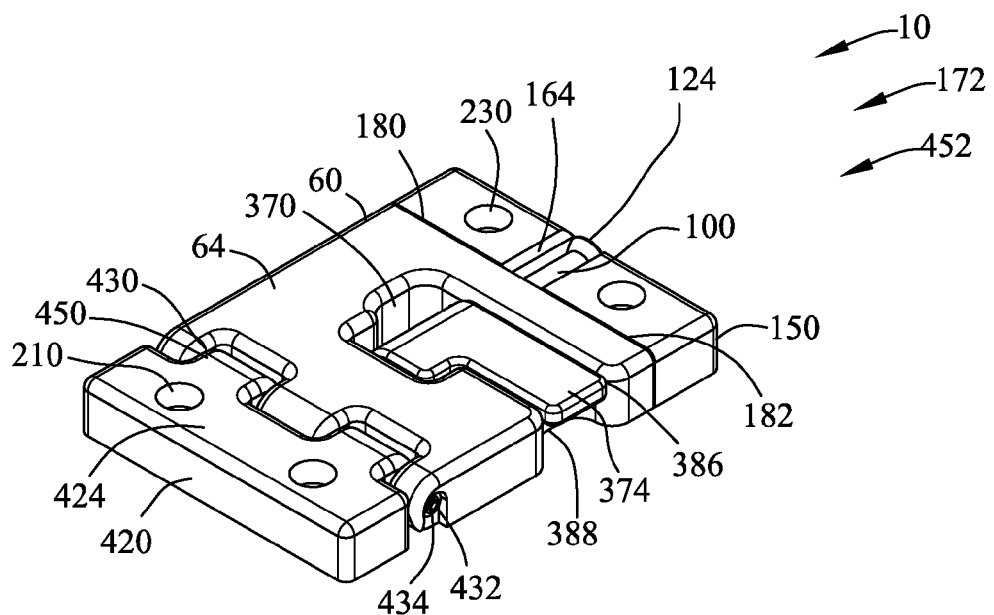
FIG. 32 is a right isometric view of a third embodiment of a latch.
Figure 33:
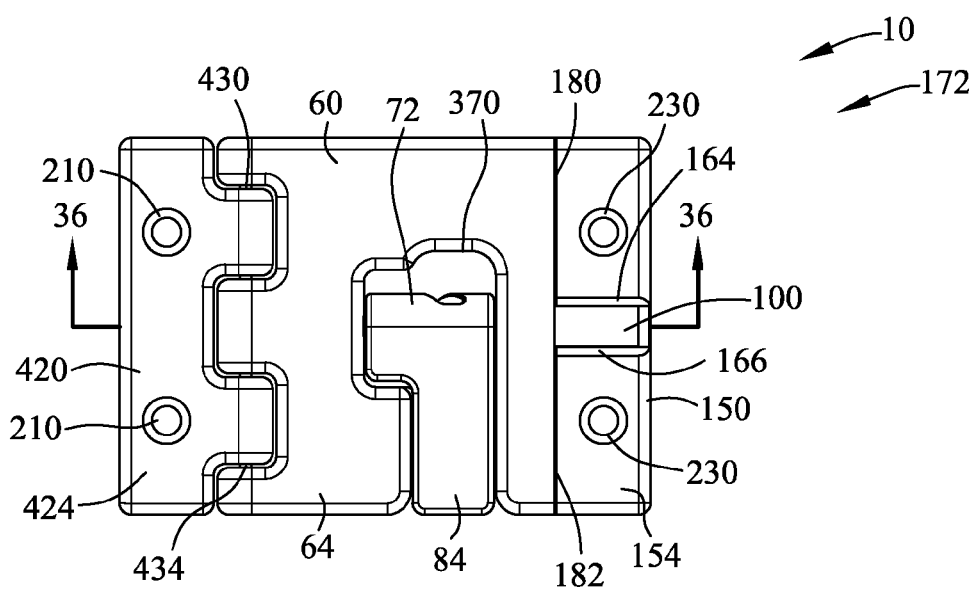
FIG. 33 is a top view of FIG. 32.
Figure 34:
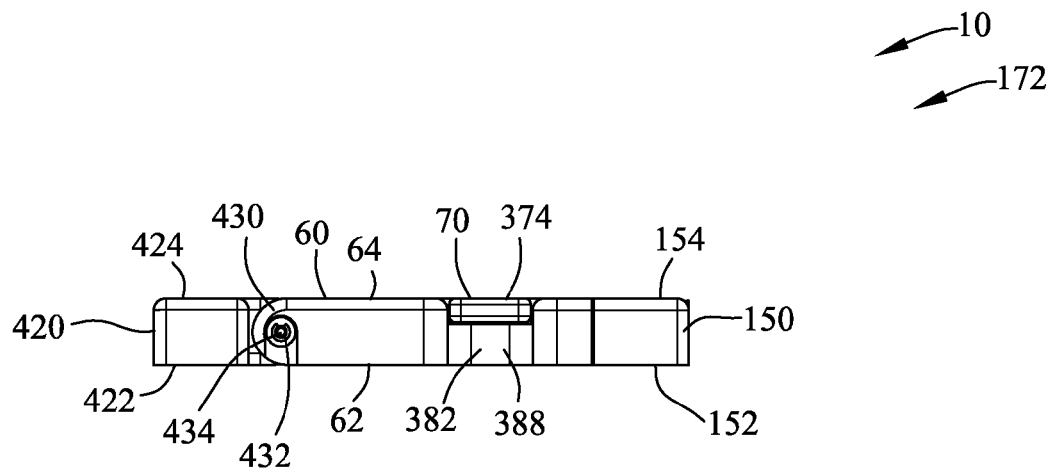
FIG. 34 is a front view of FIG. 33.
Figure 35:
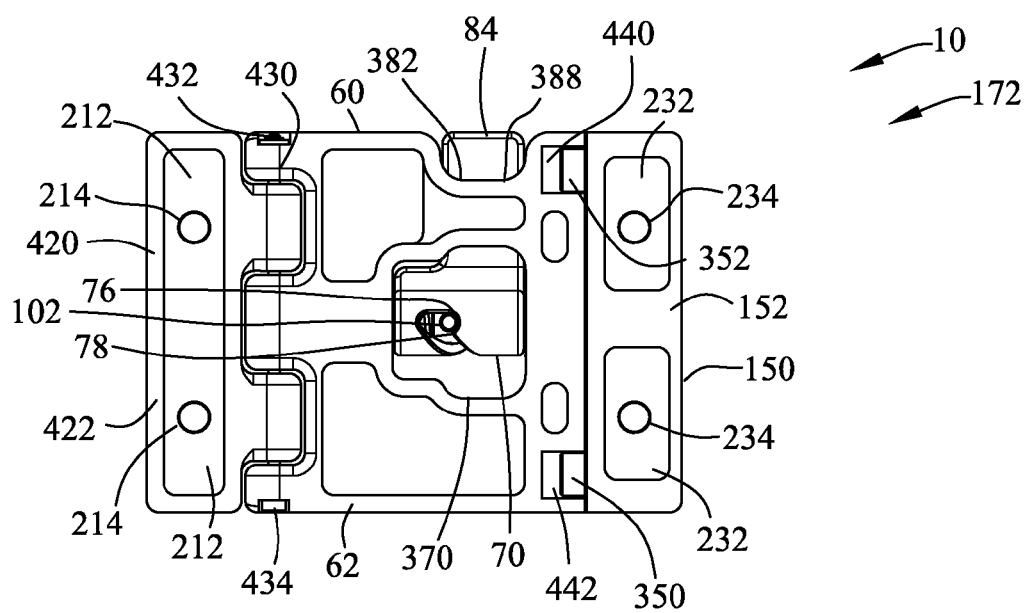
FIG. 35 is a bottom view of FIG. 33.
Figure 36:
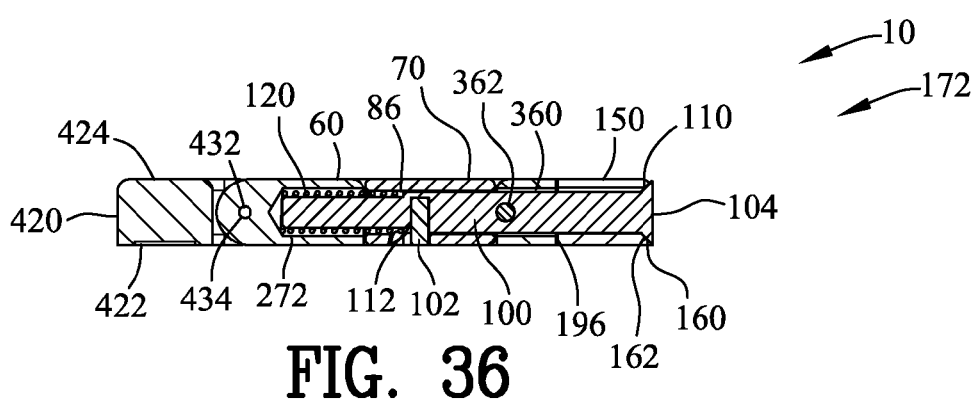
FIG. 36 is a sectional view along line 36-36 in FIG. 33.
Figure 37:
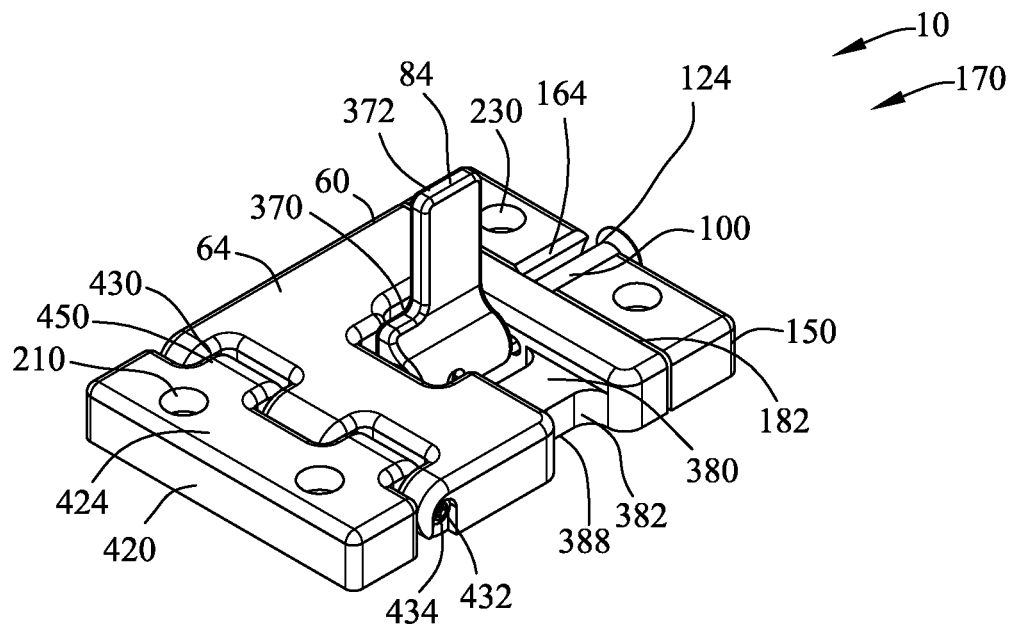
FIG. 37 is a similar view of FIG. 32 illustrating a handle in a vertical position.
Figure 38:
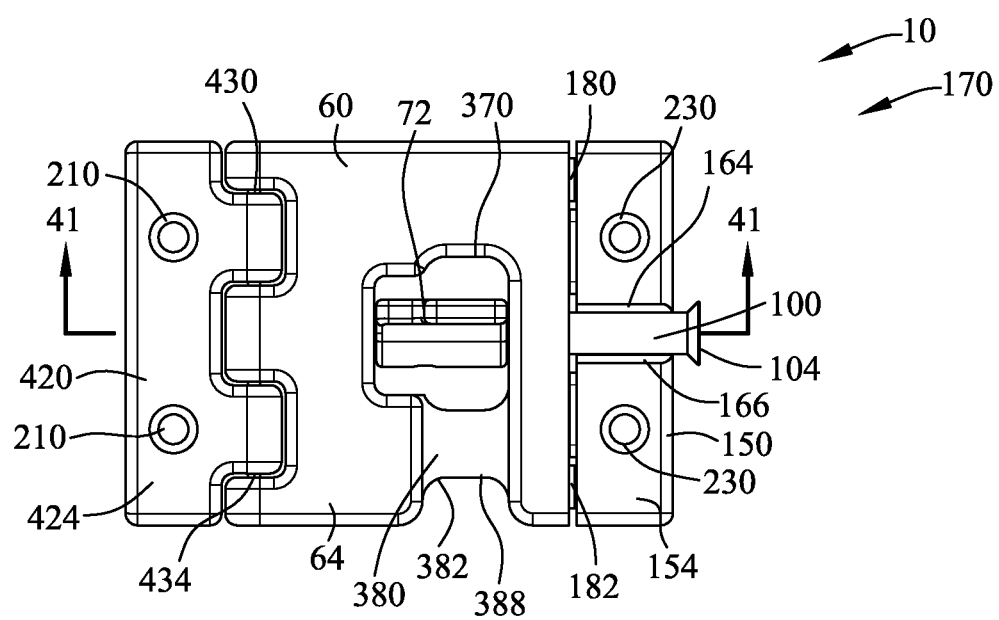
FIG. 38 is a top view of FIG. 37.
Figure 39:
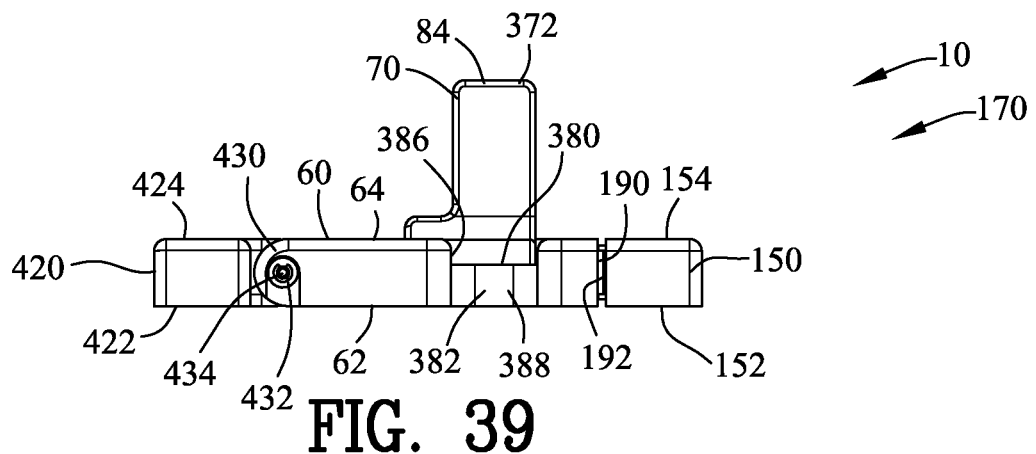
FIG. 39 is a front view of FIG. 38.
Figure 40:
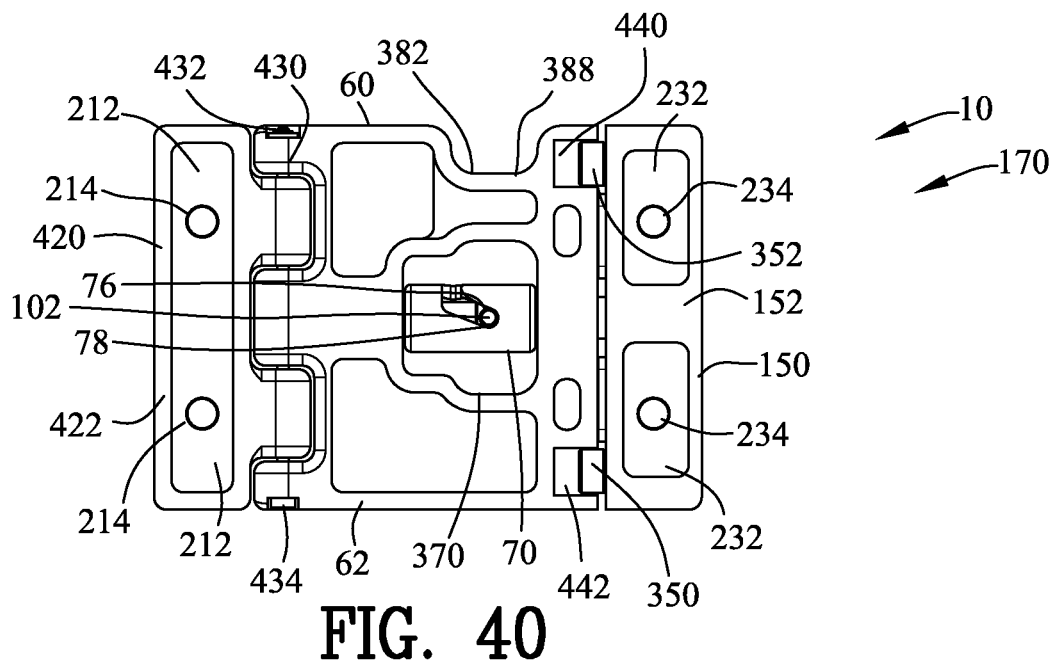
FIG. 40 is a bottom view of FIG. 38.
Figure 41:
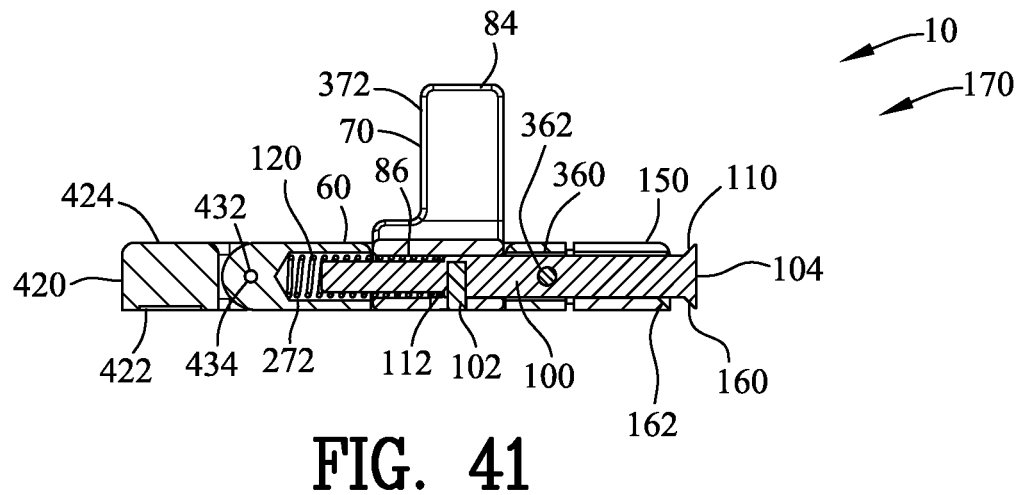
FIG. 41 is a sectional view along line 41-41 in FIG. 38.
Figure 42:
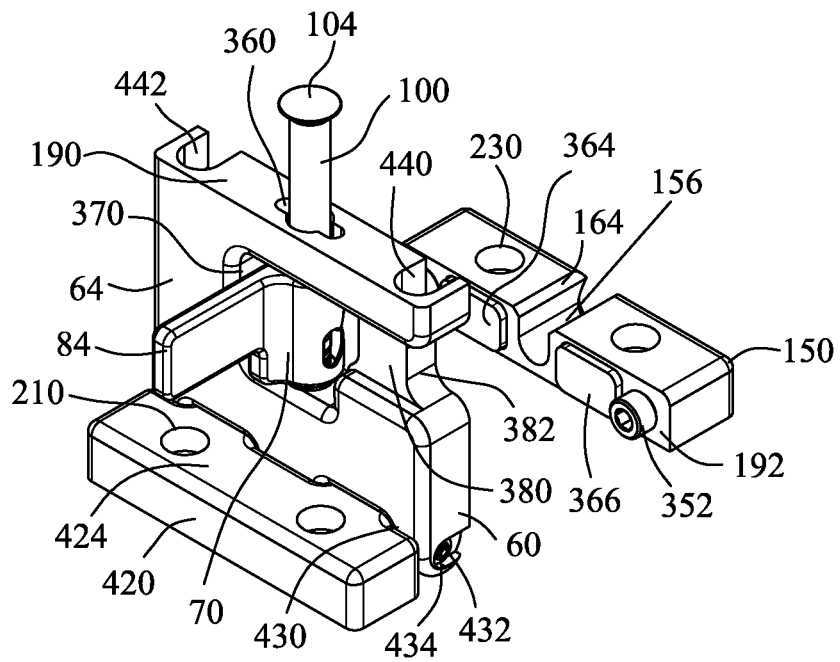
FIG. 42 is a view similar to FIG. 37 illustrating a primary block pivotably displaced relative to a secondary block.
Figure 43:
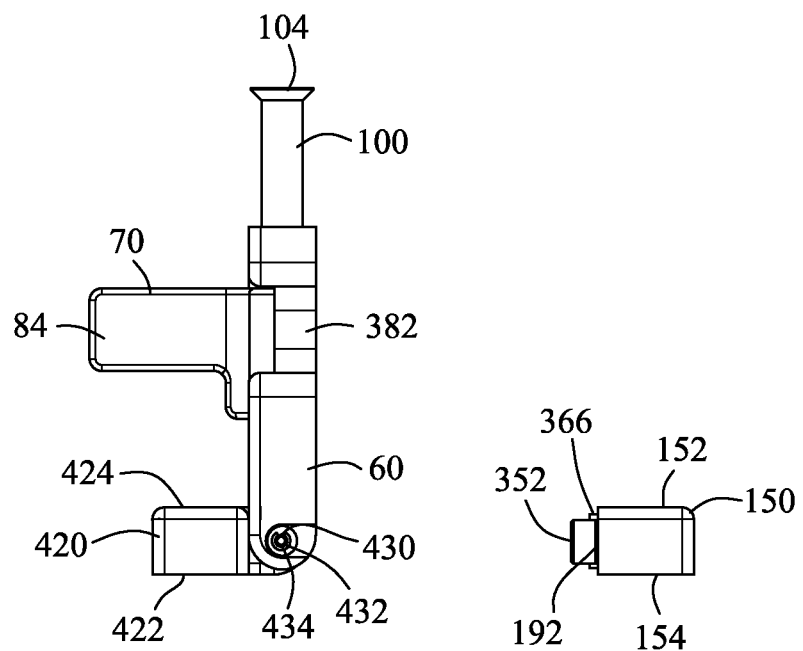
FIG. 43 is a right side view of FIG. 42.
Figure 44:
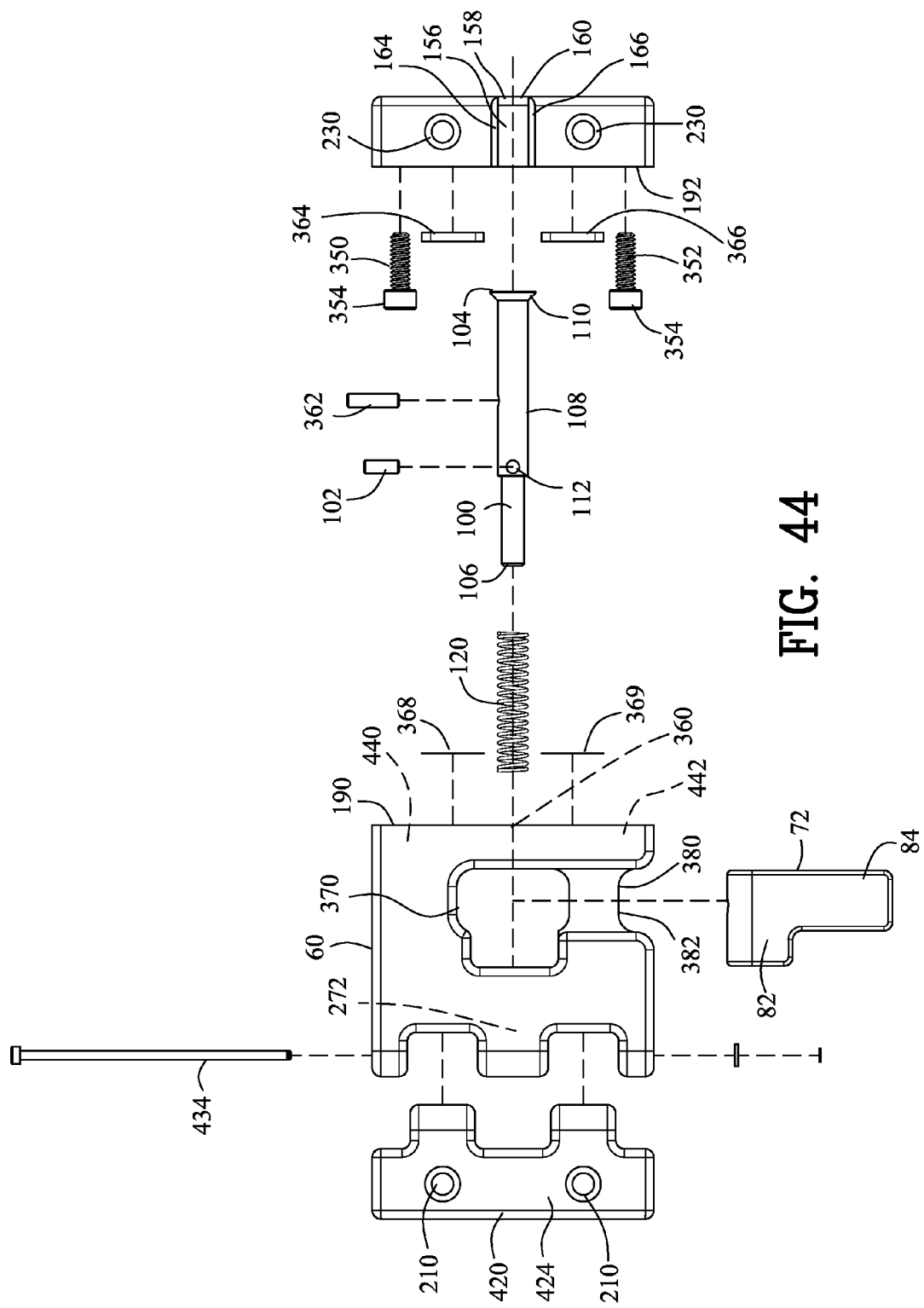
FIG. 44 is an exploded view of FIG. 33.
Figure 45:
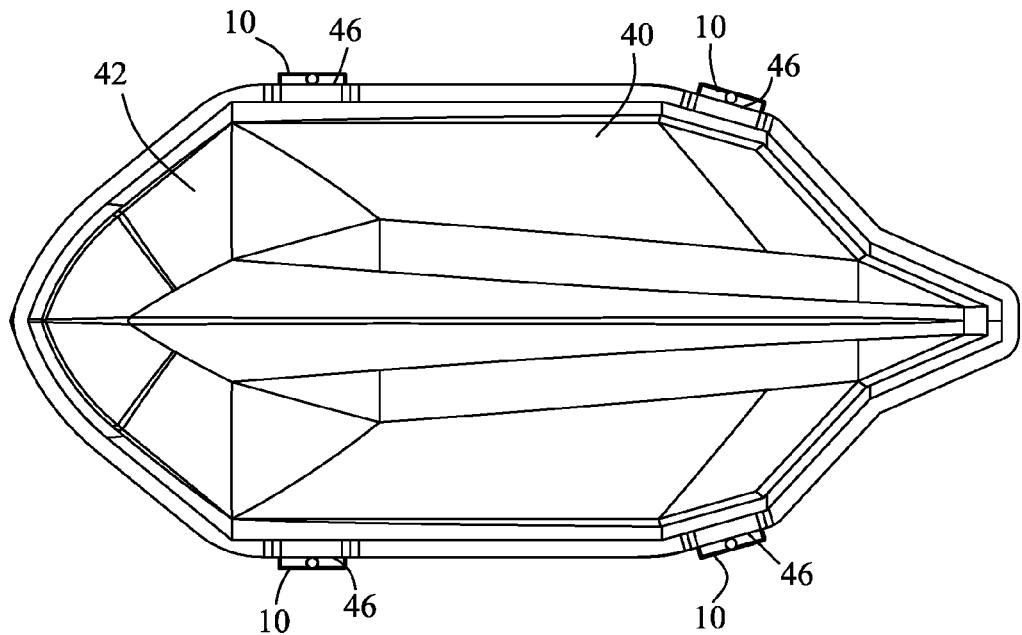
FIG. 45 is a top view of a plurality of latches of FIG. 32 coupling an unmanned aerial vehicle.
Figure 46:
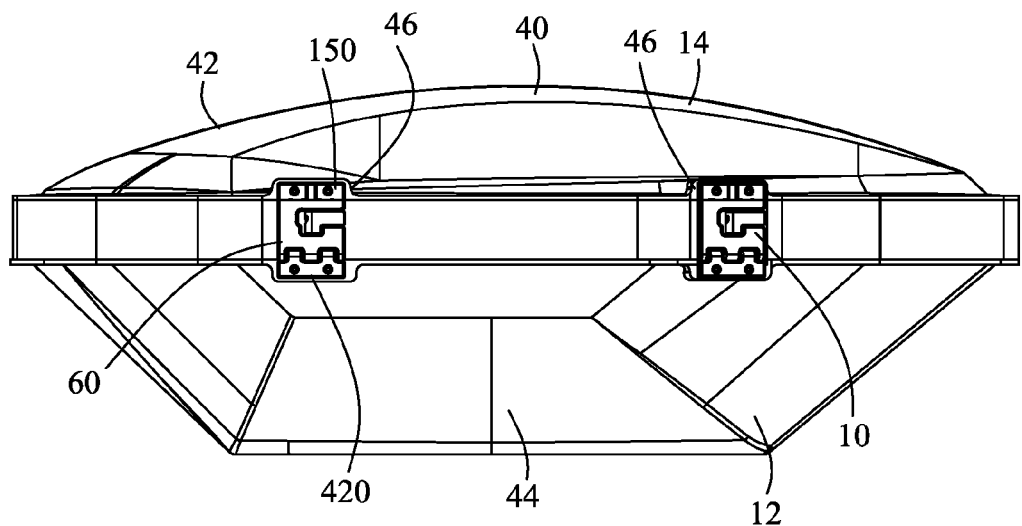
FIG. 46 is a side view of FIG. 45.
Figure 47:
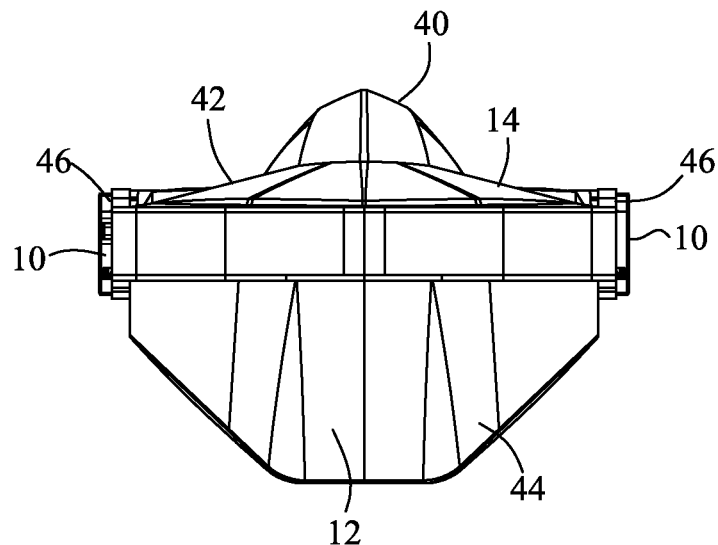
FIG. 47 is a front view of FIG. 46.
Figure 48:
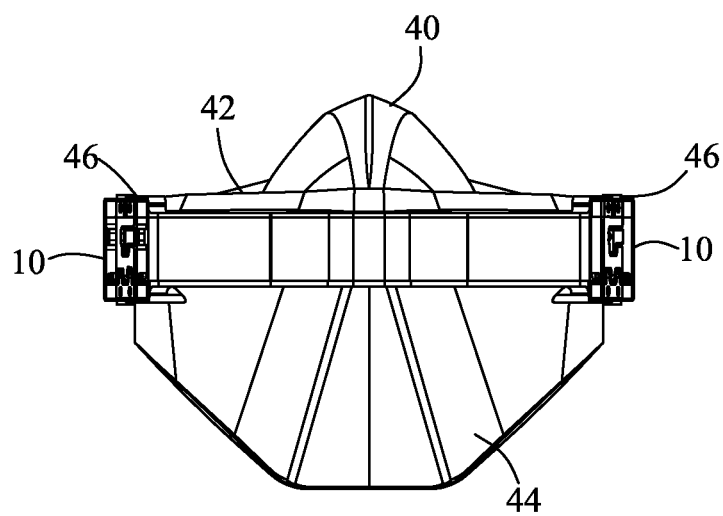
FIG. 48 is a rear view of FIG. 46.
Figure 49:
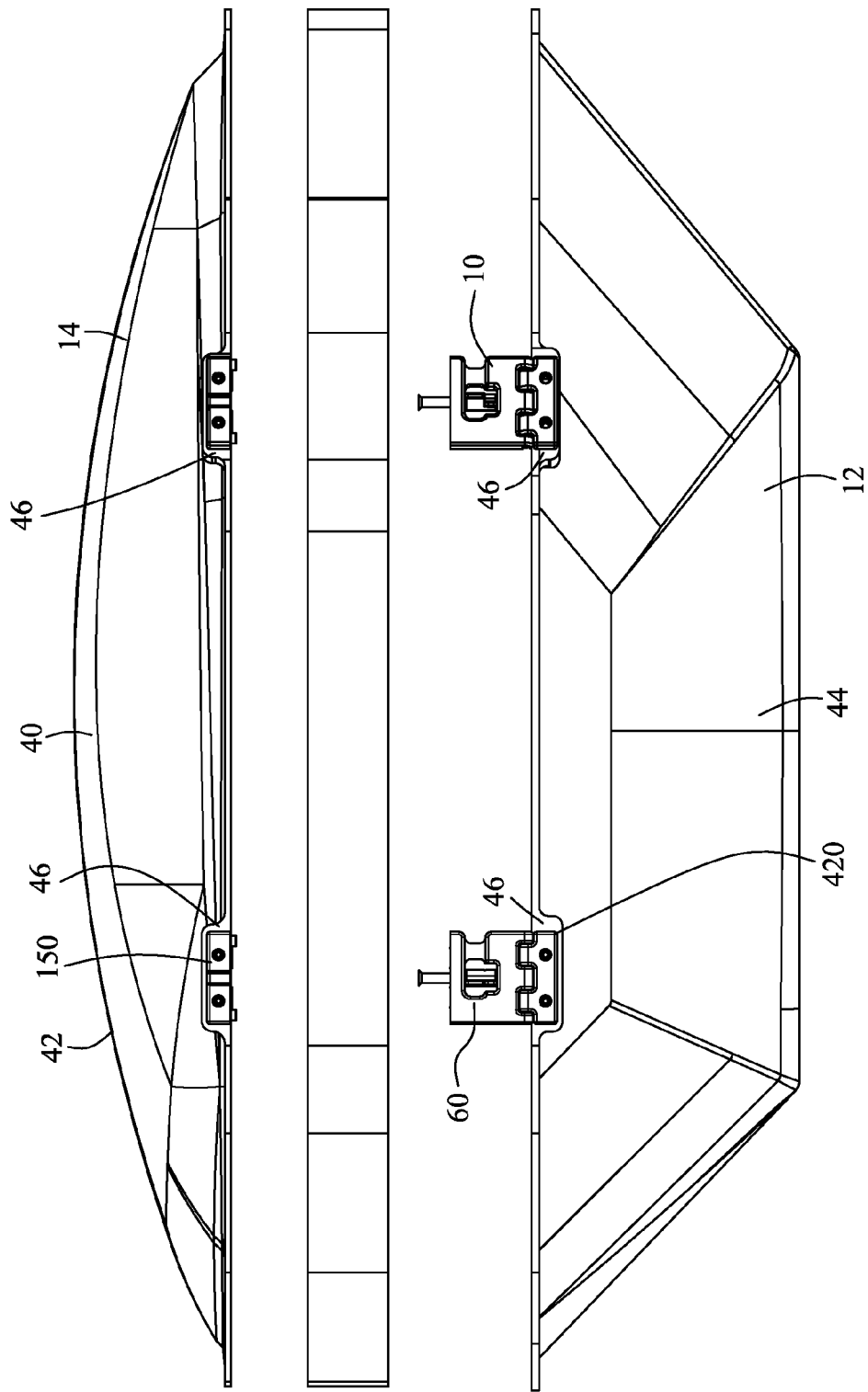
FIG. 49 is an exploded view of FIG. 46.

FIGS. 1-49 illustrate a latch 10 for coupling a first object 12 to a second object 14. The latch 10 comprises a primary block 60 defining a bottom surface 62 and an upper surface 64 and coupled to the first object 12. A locking cam 70 is rotatably coupled to the primary block 60. A cam track 72 is in the locking cam 70. The cam track has a sloped surface 74 between a track indent 76 and a track stopping surface 80. A locking stem 100 slideably engages the primary block 60 and traverses the locking cam 70. A cam pin 102 is coupled to the locking stem 100. More specifically, the locking stem 100 includes a stem aperture 112 for receiving the cam pin 102. The cam pin 102 slidably engages the sloped surface 74 of the cam track 72 for displacing the locking stem 100 between an extended position 122 and a retracted position 124 during rotation of the locking cam 70. The locking stem 100 includes a stem cylindrical body 108 having a stem head 104 and a stem end 106 at opposing ends.

A secondary block 150 defines a bottom surface 152 and an upper surface 154 and coupled to the second object 14. A cam channel 156 is in the secondary block 150 for receiving the locking stem 100. A head receiver 158 is in the secondary block 150 for engaging the stem head 104. The extended position 122 of the locking stem 100 distances the stem head 104 from the head receiver 158 for defining an unlocked position 170. The retracted position 124 of the locking stem 100 compresses the stem head 104 with the head receiver 158 for defining a locked position 172.

A primary interlocking body 180 is coupled to the primary block 60. A secondary interlocking body 182 is coupled to the secondary block 150. The primary interlocking body 180 and the secondary interlocking body 182 engage for aligning, the primary block 60 relatives to the secondary block 150 before transitioning the latch 10 from the unlocked position 172 to the locked position 172.

The locking cam 70 includes a locking cam base 82 and a handle 84. The locking cam base 82 includes a basic bore 86. The handle 84 extends from the locking cam 70 for rotating the locking cam 70 relative to the primary block 60.

The track indent 76 is in the cam track 72 for receiving the cam pin 102 during the locked position 172. The track step 78 is between the track indent 76 and the cam track 72 for preventing accidental removal of the cam pin 102 from the track indent 76.

A locking stem spring 120 is adjacent to the locking stem 70 and abuts the stem end 106. The locking stem spring 120 applies an expanding force against the locking stem 70 during rotation of the locking cam 70 for displacing the locking stem 70 in the extended position 122.

The primary block 60 includes a primary abutment surface 190. The secondary block 150 includes a secondary abutment surface 192. A polymeric layer 194 is coupled to the secondary abutment surface 192. The polymeric layer 194 is compressed between the primary abutment surface 190 and the secondary abutment surface 192 in the locked position 172 for increasing a sliding frictional coefficients 196 between the primary block 60 relative to the secondary block 150.

The stem head 104 includes a tapered body 110. The head receiver 158 includes a tapered surface 160. The tapered body 110 and the tapered surface 160 define a parallel contact surface area 162 for centering the locking stem 100 within the cam channel 156. The secondary block 150 includes a first descending surface 164 and a second descending surface 166 adjacent to the cam channel 156 for directing the locking stem 100 into the cam channel 156.

A primary counterbore hole 210 is recessed from the upper surface 64 of the primary block 60. A primary adhesive chamber 212 is recessed from the bottom surface 62 of the primary block 60. A primary bore hole 214 extends between the primary counterbore hole 210 and the primary adhesive chamber 212. A primary adhesive 216 fills the primary counterbore hole 210, the primary bore hole 214 and the primary adhesive chamber 212 and adheres the primary block 60 to the first object 12 for defining a first anchor 218. Alternatively, the first anchor may include a primary fastener such as screws, bolts or other fasteners. A secondary counterbore hole 230 is recessed from the upper surface 154 of the secondary block 150. A secondary adhesive chamber 232 is recessed from the bottom surface 152 of the secondary block 150. A secondary bore hole 234 extends between the secondary counterbore hole 230 and the secondary adhesive chamber 232. A secondary adhesive 236 fills the secondary counterbore hole 230, the secondary bore hole 234 and the secondary adhesive chamber 232 and adheres the secondary block 150 to the second object 14 for defining a second anchor 238. Alternatively, the second anchor 238 may include a secondary fastener 240 such as screws, bolts or other fasteners.

FIGS. 1-15 illustrate a first embodiment of the latch 10. The primary block 60 further includes a cylindrical housing 270. The cylindrical housing 270 includes a housing bore 272 and a housing aperture 274. The housing bore 272 receives the spring 120 and the locking stem 100. The housing aperture 274 receives the cam pin 102. The cylindrical housing 270 is positioned within the base bore 86 for rotatably engaging the locking cam 70 about the cylindrical housing 270.

A primary riser 260 is coupled to the primary block 60 and extends above the upper surface 64. A first primary block arm 262 extends from the primary riser 260. A second primary block arm 264 extends from the primary riser 260. A primary arm channel 266 is defined between the first primary block arm 262 and the second primary block arm 264. The primary abutment surface 268 is defined on the primary riser 260 and is adjacent to the first primary block arm 262 and the second primary block arm 264.

A secondary riser 280 is coupled to the secondary block 150 and extends above the upper surface 154. The secondary riser 280 defines a first secondary block step 282 adjacent to a second secondary block step 284. The secondary riser 280 further defines a third secondary block step 286 adjacent to a fourth secondary block step 288. The secondary abutment surface 290 is defined on the secondary riser 280.

The first primary block arm 262 is positioned adjacent to the first secondary block step 282 and the second secondary block step 284 for defining a first alignment interface 300. The second primary block arm 264 is positioned adjacent to the third secondary block step 286 and the fourth secondary block step 288 for defining a second alignment interface 302. The second secondary block step 284 and the fourth secondary block step 288 are positioned within the primary arm channel 266 for defining a third alignment interface 304. The first alignment interface 300, the second alignment interface 302 and the third alignment interface 304 engage for aligning the primary block 60 relative to the secondary block 150 before transitioning the latch 10 from the unlocked position 172 to the locked position 172.

As best shown in FIG. 15, the secondary riser 280 includes a secondary riser extension 310 for distancing the primary block 60 with the secondary block 150 and defining a block passage 312. The block passage 312 may receive a portion of the first object 12 and a portion of the second object 14. The latch 10 of the first embodiment may be constructed from a metallic material such as aluminum, steel, stainless steel, titanium or other metallic materials. Alternatively, latch 10 of the first embodiment may be constructed from a polymeric material or carbon fiber material.

FIGS. 11-15 illustrate the first embodiment of the latch 10 engaging a reflector 20. In order to facilitate the transportation and storage of the reflector 20, the reflector 20 may include a plurality of reflector sections 22. Each reflector section 22 includes an interior arcuate edge 24, a first linear side edge 26, a second liner side edge 28 and an exterior arcuate edge 30. The reflector 20 further includes a circular reflector section 32 defining a circumference edge 34. The interior arcuate edge 24, the first linear side edge 26, the second liner side edge 28 and the circumference edge 34 may include a first raised edge 36 and a second raised edge 34 for displacing the compressor force between the reflector sections 22.

The interior arcuate edge 24, the first linear side edge 26, the second liner side edge 28 and the circumference edge 34 may include one or more latches 10 for coupling the plurality of reflector sections 22 and circular reflector section 32 together. The latches 10 permit the reflector 20 to be assembled and disassembled without having to flex or to deform the reflector sections 22.

FIGS. 16-31 illustrate a second embodiment of the latch 10. A first primary pin bore 340 and a second primary pin bore 342 are within the primary block 60. A first secondary pin 350 and a second secondary pin 352 extend from the secondary block 150. The first primary pin bore 340 and the second primary pin bore 342 engage the first secondary pin 350 and the second secondary pin 352 respectively for aligning the primary block 60 relative to the secondary block 150 before transitioning the latch 10 from the unlocked position 172 to the locked position 172. The first secondary pin 350 and the second secondary pin 352 may include bolts 354 threadably engaging into the secondary block 150.

A primary block aperture 370 is within the primary block 60. The locking cam base 82 is rotatably coupled within the primary block aperture 370 for positioning the handle 84 in a generally vertical orientation 372 in the unlocked position 170 and a generally horizontal orientation 374 in the locked position 172. The primary block 60 further includes a keyed channel 360 for positioning the locking stem 100 into the primary block 60. A channel pin 362 traverses the locking stem 100 and engages the keyed channel 364 for preventing rotation of the locking stem 100 relative to the primary block 60.

A first polymeric layer 364 and a second polymeric layer 366 are coupled to the secondary abutment surface 192. Furthermore, a third polymeric layer 368 and a fourth polymeric layer 369 are coupled to the primary abutment surface 190. The first polymeric layer 364 and the third polymeric layer 368 are compressed between the primary abutment surface 190 and the secondary abutment surface 192 in the locked position 172 for increasing a sliding frictional coefficients 196 between the primary block 60 relative to the secondary block 150. The second polymeric layer 366 and the fourth polymeric layer 369 are compressed between the primary abutment surface 190 and the secondary abutment surface 192 in the locked position 172 for increasing a sliding frictional coefficients 196 between the primary block 60 relative to the secondary block 150.

The primary block 60 includes a primary vertical recess 380 extending from the upper surface 64 and a primary horizontal recess 382 adjacent to the primary vertical recess 380. The handle 84 is positioned within the primary vertical recess 380 in the locked position 172 for defining a primary continuous linear upper surface 384 and a primary continuous linear side surface 386. The primary horizontal recess 382 and the handle 84 define a lifting orifice 388 in the locked position 172 for displacing the handle 84 from the generally horizontal orientation 374 to the generally vertical orientation 372.

A secondary block aperture 400 is within the secondary block 150. The secondary block aperture 400 receives the locking stem 100 and the stem head 104 in the extended position 122. The cam channel 156 and the head receiver 158 are positioned adjacent to the secondary block aperture 400 for defining a secondary continuous linear upper surface 402. The primary continuous linear upper surface 384 and the secondary continuous linear upper surface 402 define a continuous linear upper surface 404 over the entire latch 10. The latch 10 of the second embodiment may be constructed from a metallic material such as aluminum, steel, stainless steel, titanium or other metallic materials. Alternatively, latch 10 of the second embodiment may be constructed from a polymeric material or carbon fiber material.

FIGS. 27-31 illustrate the second embodiment of the latch 10 engaging a reflector 20. In order to facilitate the transportation and storage of the reflector 20, the reflector 20 may include a plurality of reflector sections 22. Each reflector section 22 includes an interior arcuate edge 24, a first linear side edge 26, a second liner side edge 28 and an exterior arcuate edge 30. The reflector 20 further includes a circular reflector section 32 defining a circumference edge 34. The interior arcuate edge 24, the first linear side edge 26, the second liner side edge 28 and the circumference edge 34 may include a first raised edge 36 and a second raised edge 34 for displacing the compressor force between the reflector sections 22.

The interior arcuate edge 24, the first linear side edge 26, the second liner side edge 28 and the circumference edge 34 may include one or more latches 10 for coupling the plurality of reflector sections 22 and circular reflector section 32 together. The latches 10 permit the reflector 20 to be assembled and disassembled without having to flex or to deform the reflector sections 22.

FIGS. 32-49 illustrate a third embodiment of the latch 10. A primary pivot block 420 defines a bottom surface 422 and an upper surface 424 for coupling to the first object 12. A pivot 430 pivotably couples the primary block 60 with the primary pivot block 420 and pivoting the primary block 60 relative to the primary pivot block 420. The pivot 430 may include a hinge 432 receiving a hinge pin 434.

The extended position 122 of the locking stem 100 distances the stem head 104 from the head receiver 158 for defining the unlocked position 170 and thereafter permitting the primary block 60 to be pivotably displaced relative to the secondary block 150. The retracted position 124 of the locking stem 100 compresses the stem head 104 with the head receiver 158 for defining the locked position 172 and prohibiting the primary block 60 from being pivotably displaced relative to the secondary block 150.

A primary counterbore hole 210 is recessed from the upper surface 424 of the primary pivot block 420. A primary adhesive chamber 212 is recessed from the bottom surface 422 of the primary pivot block 420. A primary bore hole 214 extends between the primary counterbore hole 210 and the primary adhesive chamber 212. A primary adhesive 216 fills the primary counterbore hole 210, the primary bore hole 214 and the primary adhesive chamber 212 and adheres the primary pivot block 420 to the first object 12 for defining a first anchor 218.

A first primary open slot 440 and a second primary open slot 442 are in the primary block 60. The first secondary pin 350 and a second secondary pin 352 extend from the secondary block 150. The first primary open slot 440 and the second primary open slot 442 slidably engage the first secondary pin 350 and the second secondary pin 352 respectively for aligning the primary block 60 relative to the secondary block 150 before transitioning the latch 10 from the unlocked position 172 to the locked position 172.

The upper surface 424 of the primary pivot block 420 defines a primary pivot continuous linear upper surface 450. The primary continuous linear upper surface 284, the primary pivot continuous linear upper surface 350 and the secondary continuous linear upper surface 402 define a continuous linear upper surface 452 over the entire latch 10.

FIGS. 45-49 illustrate the third embodiment of the latch 10 engaging an unmanned aerial vehicle 40. The unmanned aerial vehicle 40 includes an upper fuselage section 42 and a lower fuselage section 44. A middle fuselage section 48 may be position between the upper fuselage section 42 and the lower fuselage section 44. The latch 10 of the third embodiment is positioned between the upper fuselage section 42 and the lower fuselage section 44 for retaining the unmanned aerial vehicle 40 in a closed position.

Both the upper fuselage section 42 and the lower fuselage section 44 may include a plurality of mounting surfaces 46. The latch 10 of the third embodiment is secured to the plurality of mounting surfaces 46 for coupling and compressing the upper fuselage section 42 with the lower fuselage section 44. If the middle fuselage section 48 is utilized, the third embodiment is secured to the plurality of mounting surfaces 46 for coupling and compressing the middle fuselage section 48 between the upper fuselage section 42 and the lower fuselage section 44. A chassis may be coupling and compressing between the upper fuselage section 42 and the lower fuselage section 44.

If access is required within the unmanned aerial vehicle 40 the latches 10 may be positioned into the unlocked position 170 and thereafter the primary block 60 may be pivoted and distanced from the secondary block 150. Thereafter, the upper fuselage section 42 is separated from the lower fuselage section 44. The latch 10 of the third embodiment may be constructed from a metallic material such as aluminum, steel, stainless steel, titanium or other metallic materials. Alternatively, latch 10 of the third embodiment may be constructed from a polymeric material or carbon fiber material.

Figure 50:
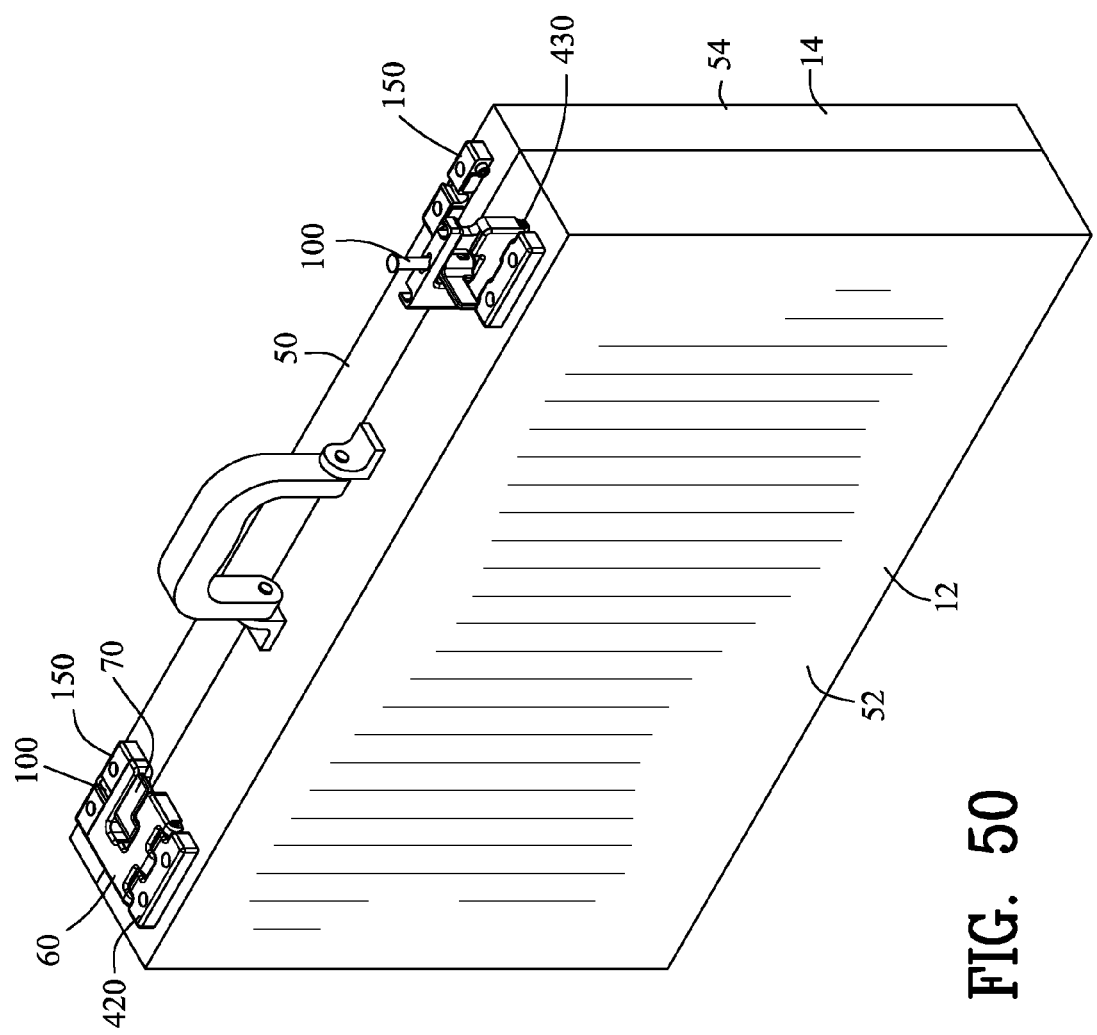
FIG. 50 is an upper isometric view of a plurality of latches of FIG. 32 coupling a case.

FIG. 50 illustrate the third embodiment of the latch 10 engaging a case 50. The case 50 includes a first case section 52 and a second case section 54. The latch 10 of the third embodiment is position between the first case section 52 and the second case section 54 for retaining the case 50 in a closed position. If access is required within the case 50 the latches 10 may be positioned into the unlocked position 170 and thereafter the primary block 60 may be pivoted and distanced from the secondary block 150. Thereafter, the first case section 52 is separated from the second case section 54.

Figure 51:
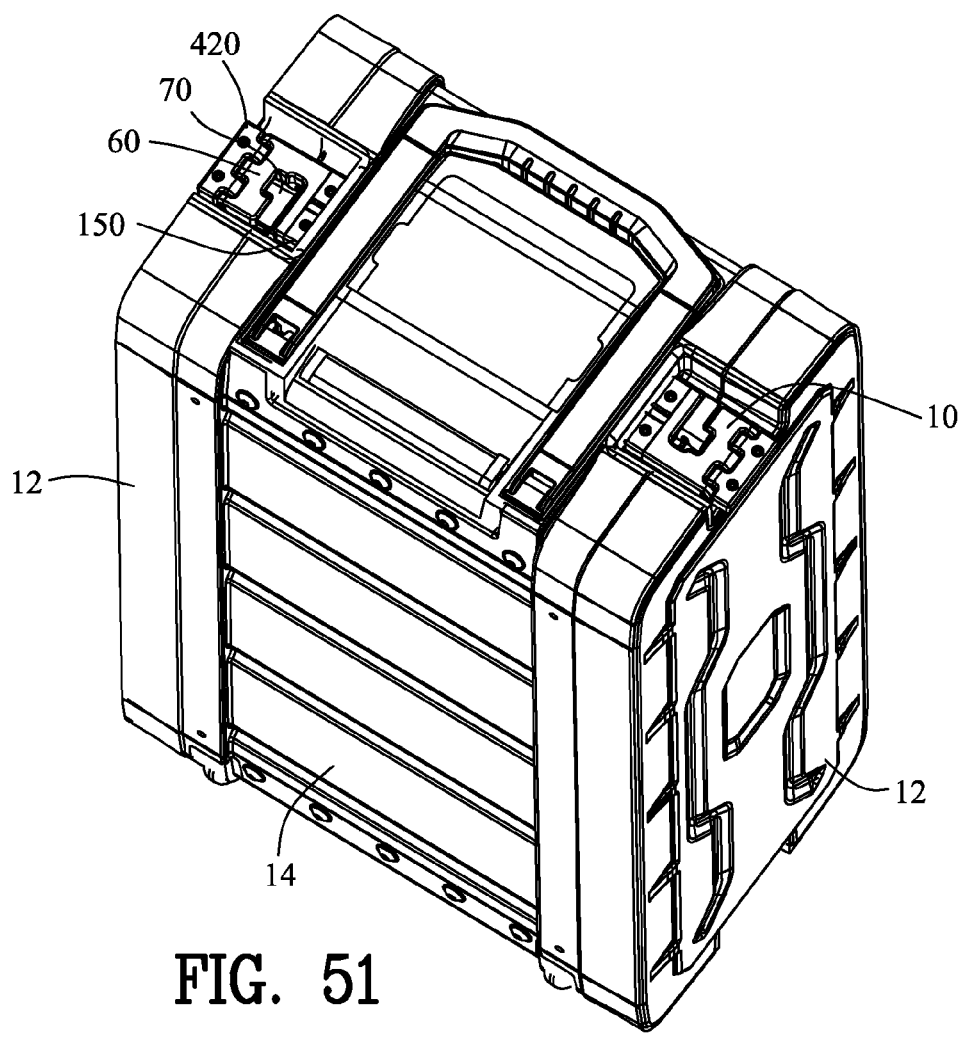
FIG. 51 is an upper isometric view of a plurality of latches of FIG. 32 coupling a transit case.
Figure 52:
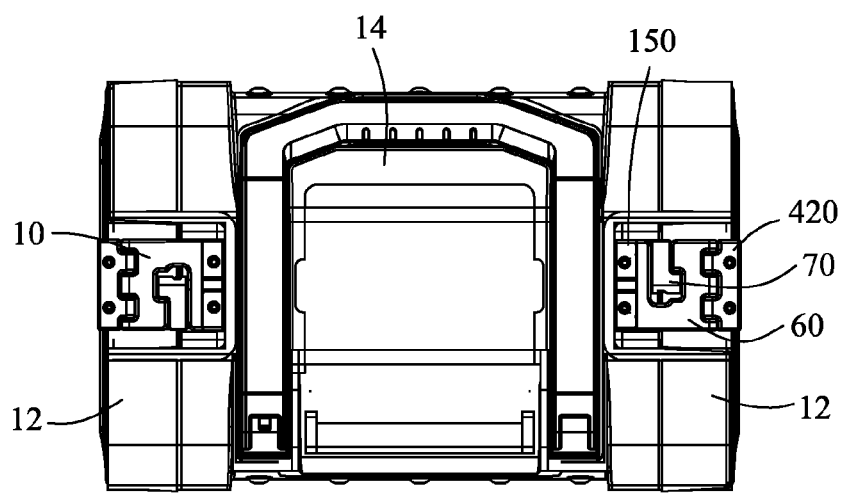
FIG. 52 is top view of FIG. 51.

FIGS. 51-52 illustrate the third embodiment of the latch 10 engaging a transit case 55. The transit case 55 includes a main case section 56, a first end case 57 and a second end case 58. The latch 10 of the third embodiment is position between the main case section 56 and the first end case 57 and also with the main case section 56 and the second end case 58 for retaining the transit case 55 in a closed position. If access is required within the transit case 55 the latches 10 may be positioned into the unlocked position 170 and thereafter the primary block 60 may be pivoted and distanced from the secondary block 150. Thereafter, the first end case 57 and the second end case 58 are separated from the main case 56.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A latch for coupling a first object to a second object, comprising:
   a primary block defining a bottom surface and an upper surface and coupled to the first object;
   a locking cam rotatably coupled to said primary block;
   a cam track in said locking cam;
   said cam track having a sloped surface;
   a locking stem slideably engaging said primary block and traversing said locking cam;
   a cam pin coupled to said locking stem;
   said cam pin slidably engaging said sloped surface of said cam track for displacing said locking stem between an extended position and a retracted position during rotation of said locking cam;
   a stem head coupled to said locking stem;
   a secondary block defining a bottom surface and an upper surface and coupled to the second object;
   a cam channel in said secondary block for receiving said locking stem;
   a head receiver in said secondary block for engaging said stem head;
   said extended position of said locking stem distancing said stem head from said head receiver for defining an unlocked position; and
   said retracted position of said locking stem compressing said stem head with said head receiver for defining a locked position.

2. The latch as set forth in claim 1, further including a primary interlocking body coupled to said primary block;
   a secondary interlocking body coupled to said secondary block; and
   said primary interlocking body and said secondary interlocking body engaging for aligning, said primary block relatives to said secondary block.

3. The latch as set forth in claim 1, further including a handle extending from said locking cam for rotating said locking cam relative to said primary block.

4. The latch as set forth in claim 1, further including a track indent in said cam track for receiving said cam pin during said locked position; and
   a track step between said track indent and said cam track for preventing accidental removal of the cam pin from said track indent.

5. The latch as set forth in claim 1, further including a locking stem spring adjacent to said locking stem applying an expanding force against said locking stem during rotation of said locking cam for displacing said locking stem in said extended position.

6. The latch as set forth in claim 1, wherein said primary block includes a primary abutment surface;
   said secondary block including a secondary abutment surface;
   a polymeric layer coupled to said secondary abutment surface; and
   said polymeric layer being compressed between said primary abutment surface and said secondary abutment surface in said locked position for increasing sliding frictional coefficients between said primary block relative to said secondary block.

7. The latch as set forth in claim 1, wherein said stem head includes a tapered body;
   said head receiver including a tapered surface; and
   said tapered body and said tapered surface defining a parallel contact surface area for centering said locking stem within said cam channel.

8. The latch as set forth in claim 1, wherein said secondary block includes a first descending surface and a second descending surface adjacent to said cam channel for directing said locking stem into said cam channel.

9. The latch as set forth in claim 1, further including a primary counterbore hole recessed from said upper surface of said primary block;
   a primary adhesive chamber recessed from said bottom surface of said primary block;
   a primary bore hole extending between said primary counterbore hole and said primary adhesive chamber;
   a primary adhesive filling said primary counterbore hole, said primary bore hole and said primary adhesive chamber and adhering to the first object for defining a first anchor;
   a secondary counterbore hole recessed from said upper surface of said secondary block:
   a secondary adhesive chamber recessed from said bottom surface of said secondary block;
   a secondary bore hole extending between said secondary counterbore hole and said secondary adhesive chamber; and
   a secondary adhesive filling said secondary counterbore hole, said secondary bore hole and said secondary adhesive chamber and adhering to the second object for defining a second anchor.

10. The latch as set forth in claim 1, further including a primary riser coupled to said primary block and extending above said upper surface;
    a first primary block arm extending from said primary riser;
    a second primary block arm extending from said primary riser;
    a primary arm channel defined between said first primary block arm and said second primary block arm;
    a primary abutment surface defining on said primary riser and adjacent to said first primary block arm and said second primary block arm;
    a secondary riser coupled to said secondary block and extending above said upper surface;
    said secondary riser defining a first secondary block step adjacent to a second secondary block step;

said secondary riser defining a third secondary block step adjacent to a fourth secondary block step;
a secondary abutment surface defining on said secondary riser;
said first primary block arm positioned adjacent to said first secondary block step and said second secondary block step for defining a first alignment interface;
said second primary block arm positioned adjacent to said third secondary block step and said fourth secondary block step for defining a second alignment interface;
said second secondary block step and said fourth secondary block step positioned within said primary arm channel for defining a third alignment interface; and
said first alignment interface, said second alignment interface and said third alignment interface engaging for aligning said primary block relative to said secondary block.

11. The latch as set forth in claim 10, wherein said secondary riser includes a secondary riser extension for distancing said primary block with said secondary block and defining a block passage; and
said block passage receiving the portion of the first object and a portion of the second object.

12. The latch as set forth in claim 1, further including a first primary pin bore and a second primary pin bore within said primary block; and
a first secondary pin and a second secondary pin extending from said secondary block; and
said first primary pin bore and said second primary pin bore engaging said first secondary pin and said second secondary pin respectively for aligning said primary block relative to said secondary block.

13. The latch as set forth in claim 1, wherein said locking cam includes a locking cam base and a handle;
a primary block aperture within said primary block; and
said locking cam base rotatably coupled within said primary block aperture for positioning said handle in a generally vertical orientation in said unlocked position and a generally horizontal orientation in said locked position.

14. The latch as set forth in claim 13, wherein said primary block includes a primary vertical recess extending from said upper surface and a primary horizontal recess adjacent to said primary vertical recess;
said handle positioned within said primary vertical recess in said locked position for defining a primary continuous linear upper surface and a primary continuous linear side surface; and
said primary horizontal recess and said handle defining a lifting orifice in said locked position for displacing the handle from said generally horizontal orientation to said generally vertical orientation.

15. The latch as set forth in claim 14, further including a secondary block aperture within said secondary block;
said secondary block aperture receiving a said locking stem and said stem head in said extended position;
said cam channel and said head receiver positioned adjacent to said secondary block aperture for defining a secondary continuous linear upper surface; and
said primary continuous linear upper surface and said secondary continuous linear upper surface defining a continuous linear upper surface.

16. A latch for coupling a first object to a second object, comprising:
a primary block defining a bottom surface and an upper surface;
a locking cam rotatably coupled to said primary block;
a cam track in said locking cam;
said cam track having a sloped surface;
a locking stem slideably engaging said primary block and traversing said locking cam;
a cam pin coupled to said locking stem;
said cam pin slidably engaging said sloped surface of said cam track for displacing said locking stem between an extended position and a retracted position during rotation of said locking cam;
a stem head coupled to said locking stem;
a primary pivot block defining a bottom surface and an upper surface and coupled to the first object;
a pivot pivotably coupling said primary block with said primary pivot block and pivoting said primary block relative to said primary pivot block;
a secondary block defining a bottom surface and an upper surface and coupled to the second object;
a cam channel in said secondary block for receiving said locking stem;
a head receiver in said secondary block for engaging said stem head;
said extended position of said locking stem distancing said stem head from said head receiver for defining an unlocked position and permitting the primary block to be pivotably displaced relative to said secondary block; and
said retracted position of said locking stem compressing said stem head with said head receiver for defining a locked position and prohibiting the primary block from being pivotably displaced relative to said secondary block.

17. The latch as set forth in claim 16, further including a primary counterbore hole recessed from said upper surface of said primary pivot block;
a primary adhesive chamber recessed from said bottom surface of said primary pivot block;
a primary bore hole extending between said primary counterbore hole and said primary adhesive chamber;
a primary adhesive filling said primary counterbore hole, said primary bore hole and said primary adhesive chamber and adhering to the first object for defining a first anchor;
a secondary counterbore hole recessed from said upper surface of said secondary block;
a secondary adhesive chamber recessed from said bottom surface of said secondary block;
a secondary bore hole extending between said secondary counterbore hole and said secondary adhesive chamber; and
a secondary adhesive filling said secondary counterbore hole, said secondary bore hole and said secondary adhesive chamber and adhering to the second object for defining a second anchor.

18. The latch as set forth in claim 16, further including a first primary open slot and a second primary open slot in said primary block;
a first secondary pin and a second secondary pin extending from said secondary block; and
said first primary open slot and said second primary open slot slidably engaging said first secondary pin and said second secondary pin respectively for aligning said primary block relative to said secondary block.

19. The latch as set forth in claim 16, wherein said locking cam includes a locking cam base and a handle;
a primary block aperture within said primary block;
said locking cam base rotatably coupled within said primary block aperture for positioning said handle in a generally vertical orientation in said unlocked position and a generally horizontal orientation in said locked position;

said primary block includes a primary vertical recess extending from said upper surface and a primary horizontal recess adjacent to said primary vertical recess;

said handle positioned within said primary vertical recess in said locked position for defining a primary continuous linear upper surface and primary continuous linear side surface;

said primary horizontal recess and said handle defining a lifting orifice in said locked position for displacing the handle from said generally horizontal position to said generally vertical position;

said upper surface of said primary pivot block defining a primary pivot continuous linear upper surface;

a secondary block aperture within said secondary block;

said secondary block aperture receiving said locking stem and said stem head in said extended position;

said cam channel and said head receiver positioned adjacent to said secondary block aperture for defining a secondary continuous linear upper surface; and said primary continuous linear upper surface, said primary pivot continuous linear upper surface and said secondary continuous linear upper surface defining a continuous linear upper surface.

20. A latch for coupling a first object to a second object, comprising:

a primary block defining a bottom surface and an upper surface and coupled to the first object;

a locking cam rotatably coupled to said primary block;

a cam track in said locking cam;

said cam track having a sloped surface;

a locking stem slideably engaging said primary block and traversing said locking cam;

a cam pin coupled to said locking stem;

said cam pin slidably engaging said sloped surface of said cam track for displacing said locking stem between an extended position and a retracted position during rotation of said locking cam;

a stem head coupled to said locking stem;

a secondary block defining a bottom surface and an upper surface and coupled to the second object;

a cam channel in said secondary block for receiving said locking stem;

a head receiver in said secondary block for engaging said stem head;

said extended position of said locking stem distancing said stem head from said head receiver for defining an unlocked position;

said retracted position of said locking stem compressing said stem head with said head receiver for defining a locked position;

a track indent in said cam track for receiving said cam pin during said locked position;

a track step between said track indent and said cam track for preventing accidental removal of the cam pin from said track indent;

said locking cam includes a locking cam base and a handle;

a primary block aperture within said primary block; and said locking cam base rotatably coupled within said primary block aperture for positioning said handle in a generally vertical orientation in said unlocked position and a generally horizontal orientation in said locked position.

* * * * *